(12) United States Patent
Kangas et al.

(10) Patent No.: US 9,876,573 B2
(45) Date of Patent: Jan. 23, 2018

(54) APPARATUS AND METHOD FOR INVENTORY OF PASSIVE MODULE

(71) Applicant: Coriant Operations, Inc., Naperville, IL (US)

(72) Inventors: Bradley Ronald Kangas, Saint Charles, IL (US); Yajun Wang, Naperville, IL (US); Robert D. Gatze, Aurora, IL (US); Julia Y. Larikova, Naperville, IL (US)

(73) Assignee: Coriant Operations, Inc., Naperville, IL (US)

( * ) Notice: Subject to any disclaimer, the term of this patent is extended or adjusted under 35 U.S.C. 154(b) by 0 days.

(21) Appl. No.: 15/140,037

(22) Filed: Apr. 27, 2016

(65) Prior Publication Data

US 2017/0317754 A1   Nov. 2, 2017

(51) Int. Cl.
*H04B 10/27* (2013.01)
*H04B 10/40* (2013.01)
*H04B 10/80* (2013.01)

(52) U.S. Cl.
CPC ............. *H04B 10/27* (2013.01); *H04B 10/40* (2013.01); *H04B 10/807* (2013.01)

(58) Field of Classification Search
CPC ....... H04B 10/27; H04B 10/40; H04B 10/807
See application file for complete search history.

(56) References Cited

U.S. PATENT DOCUMENTS

| | | | | |
|---|---|---|---|---|
| 9,225,454 | B1* | 12/2015 | Liu | ........................ H04J 14/02 |
| 2008/0120485 | A1* | 5/2008 | Rothman | ................ G06F 12/06 |
| | | | | 711/165 |
| 2015/0070802 | A1* | 3/2015 | Dong | ....................... H02H 3/16 |
| | | | | 361/49 |
| 2015/0103481 | A1* | 4/2015 | Haywood | ................ G11C 8/00 |
| | | | | 361/679.32 |
| 2017/0086325 | A1* | 3/2017 | Connor | ................ H05K 7/1489 |

\* cited by examiner

*Primary Examiner* — Shi K Li
*Assistant Examiner* — Mina Shalaby
(74) *Attorney, Agent, or Firm* — Hamilton, Brook, Smith & Reynolds, P.C.

(57) ABSTRACT

Example embodiments include an optical networking system (e.g., apparatus) and corresponding method. According to some embodiments, a plurality of shelves may be interconnected to form a daisy chain, each shelf including unpowered passive optical modules and the daisy chain including an active module having a passive power communication source. The passive power communication source may distribute passive power to memory devices on the one unpowered passive optical networking modules. The memory devices may provide respective communication as a function of interconnections of the daisy chain and passive power distributed by the passive power communication source. Advantages include unique identification of the memory devices without requiring active power to their corresponding modules, and continuous discovery and inventory of such memory devices. Such embodiments may also help network planners better manage and end-to-end optical circuit which may reduce amplification or regeneration nodes creating a more cost efficient solution.

22 Claims, 19 Drawing Sheets

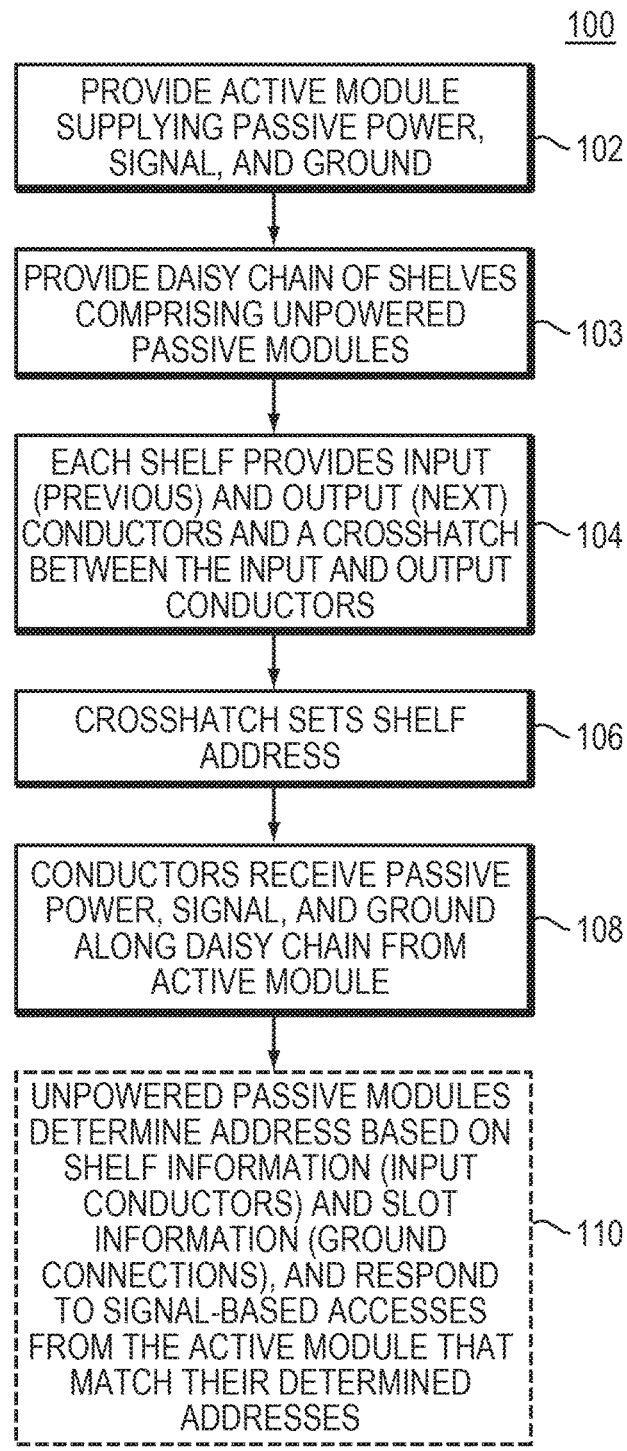
FIG. 1A-I

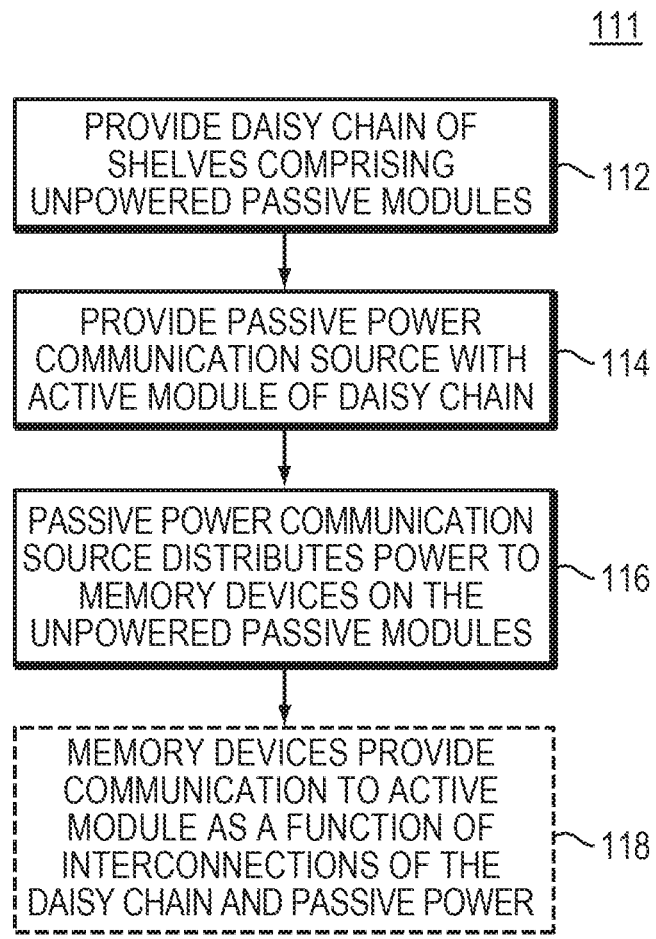
FIG. 1A-II

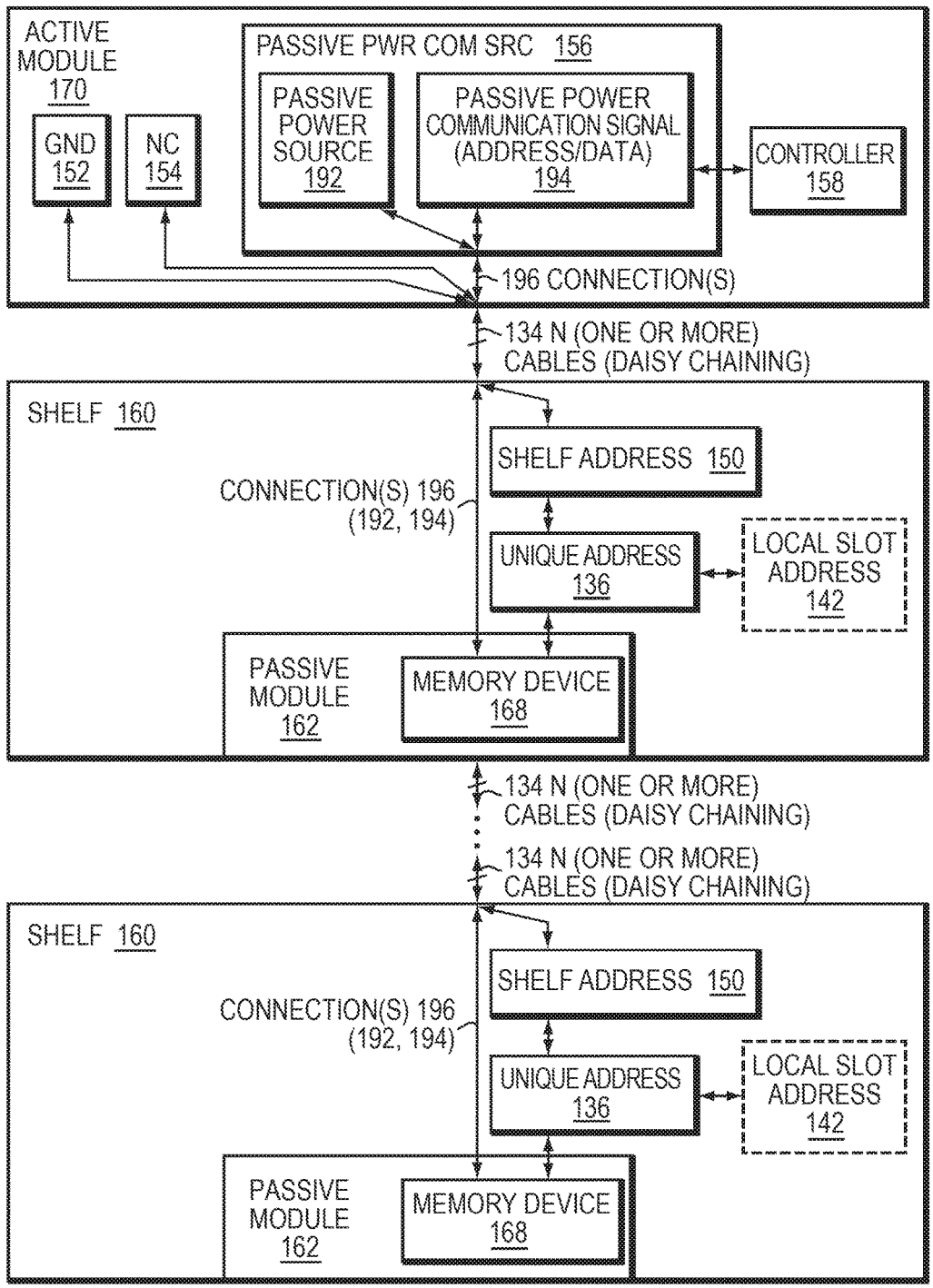
FIG. 1B-I

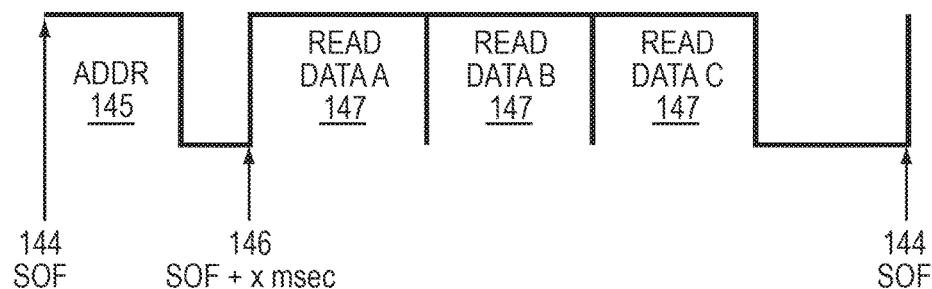
FIG. 1B-II

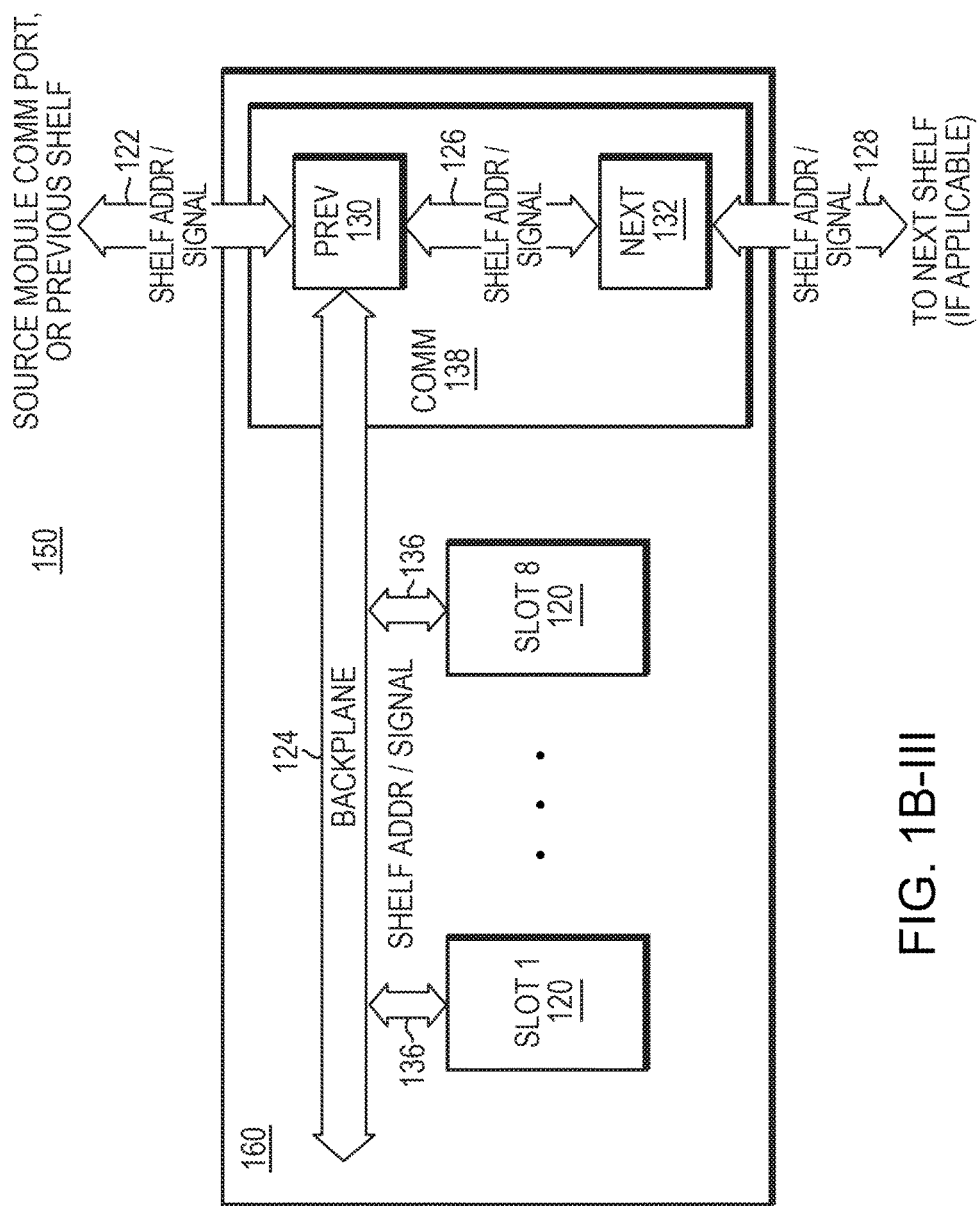
FIG. 1B-III

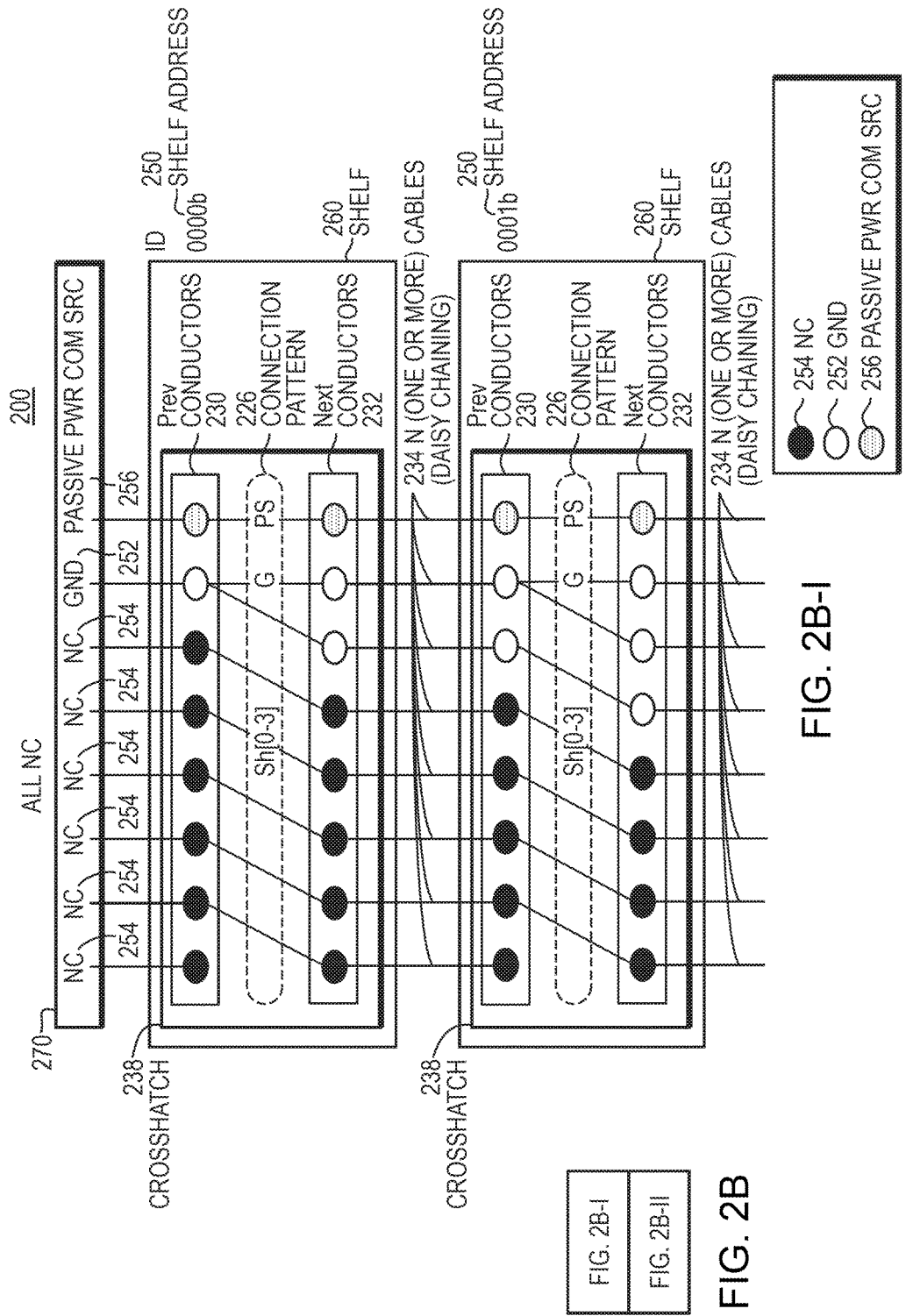

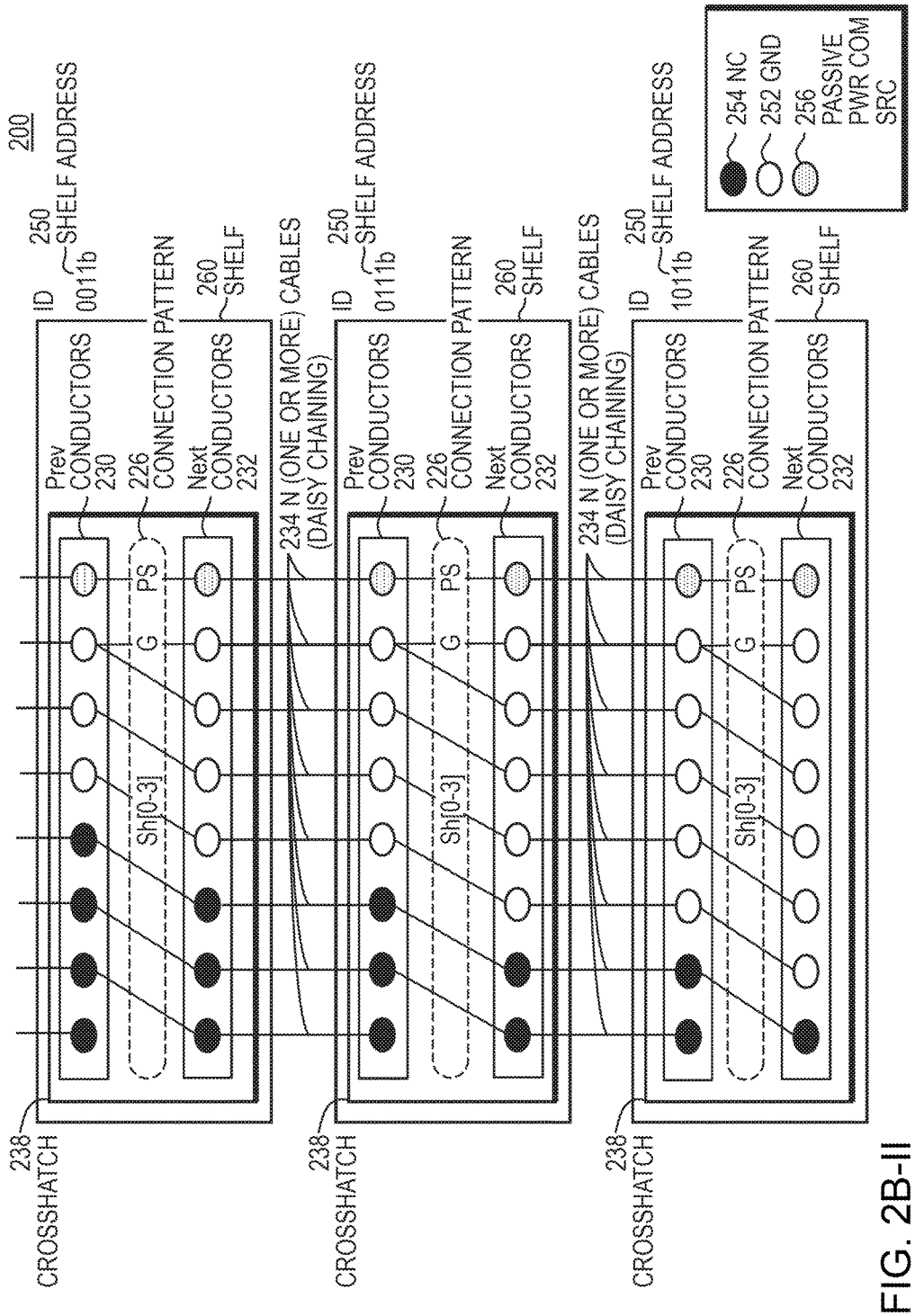
FIG. 2B-II

FIG. 3B-I

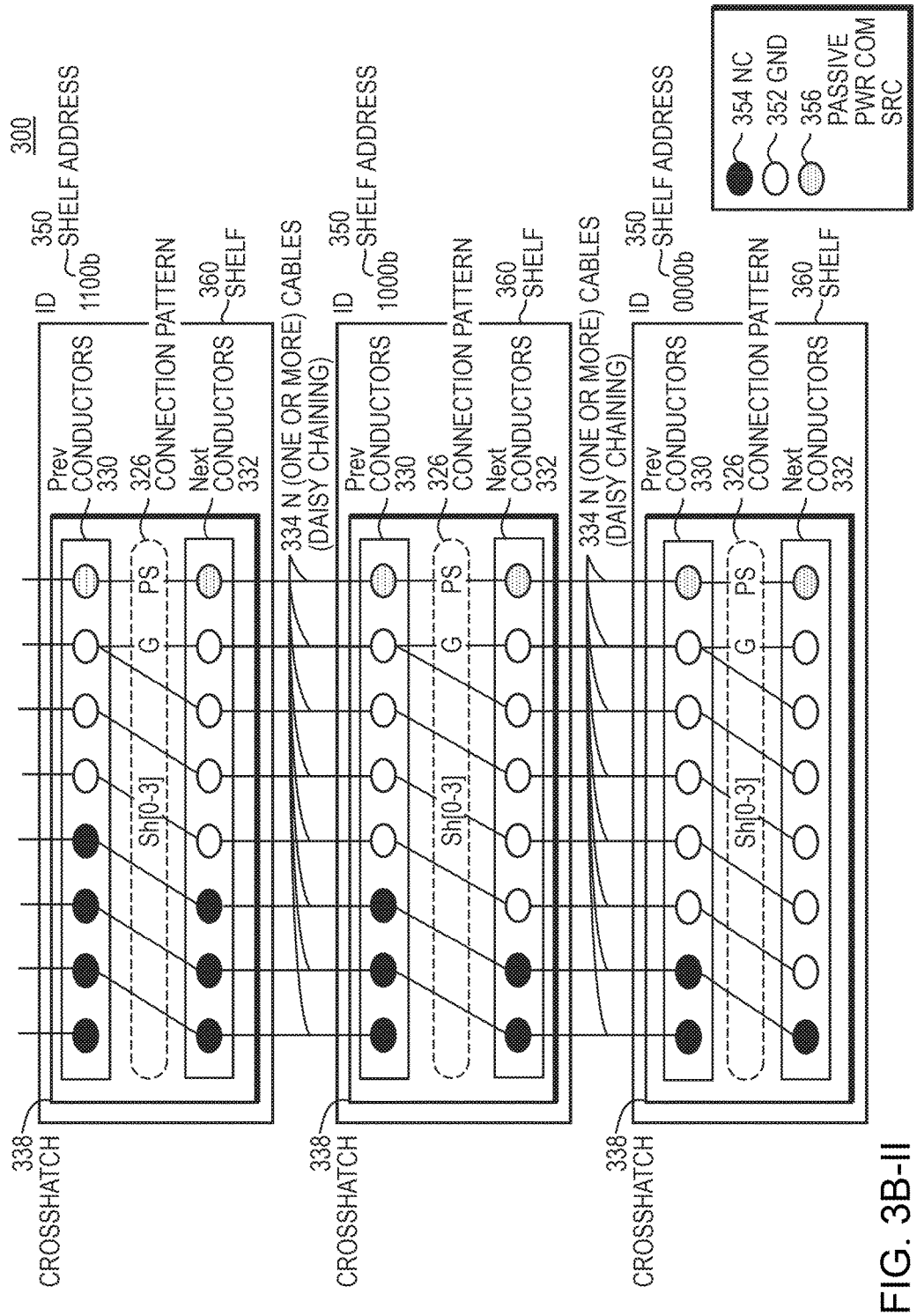
FIG. 3B-II

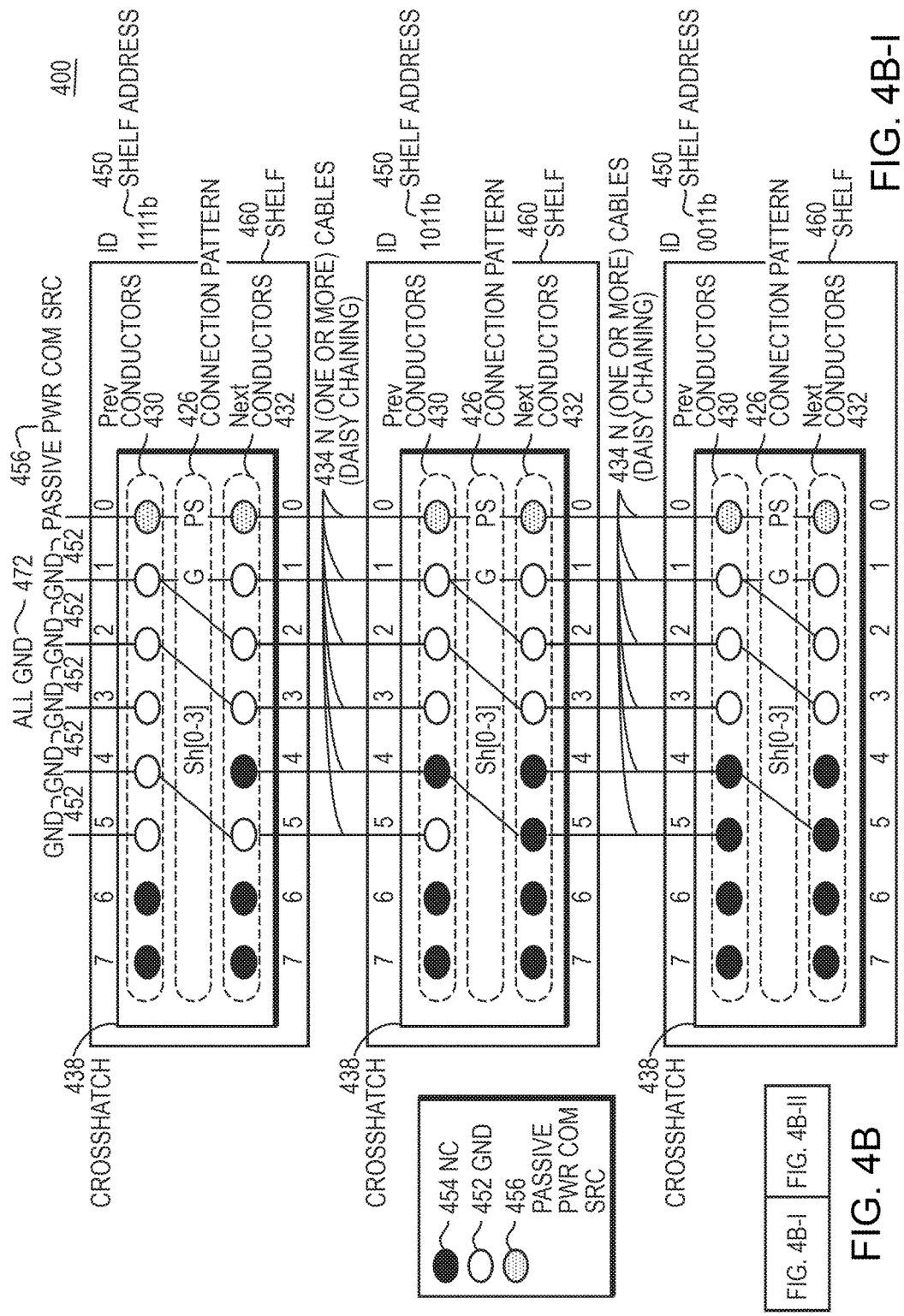

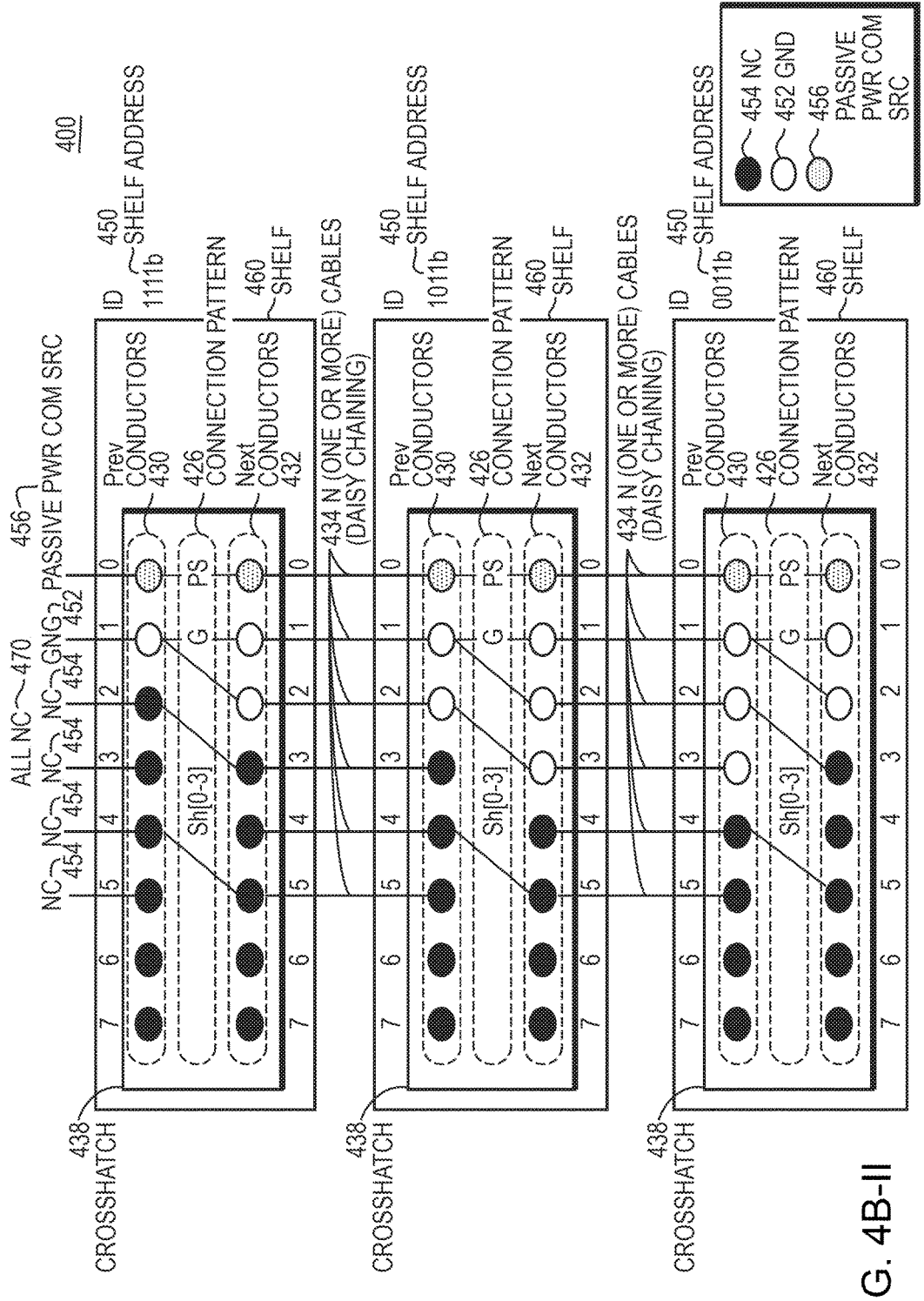
FIG. 4B-II

APPARATUS AND METHOD FOR INVENTORY OF PASSIVE MODULE

BACKGROUND

Current optical communications systems with multiple shelves may have a one-to-one relationship between powered and passive modules on the remote shelves. Using many passive modules may require many electrical cables to be routed from powered modules to their supporting passive modules, so that powered modules may inventory the passive modules.

SUMMARY OF THE INVENTION

Example embodiments of the present invention include an optical networking system (e.g., apparatus) and corresponding method as follows. According to some embodiments, a plurality of shelves may be interconnected to form a daisy chain. Each shelf may comprise one or more unpowered passive optical networking modules. The system (and method) may include an active optical networking module at a head end of the daisy chain. Some embodiments may include a shelf controller (processor), which may be part of or separate from the active optical networking module. Some embodiments may comprise a passive power communication source within the active optical networking module (or shelf controller/processor) at a head end of the daisy chain.

The passive power communication source may be configured to distribute (or provide or generate) passive power to one or more memory devices on the one or more unpowered passive optical networking modules daisy chained within the plurality of shelves of the method (or system). The one or more unpowered passive optical networking modules may be otherwise unpowered. The one or more memory devices may provide respective communication as a function of interconnections of the daisy chaining and passive power distributed by the passive power communication source.

The plurality of shelves may form the daisy chain by connecting a series of second conductors of each shelf to a series of first conductors of each next shelf of the daisy chain. Each shelf may have a crosshatch (i.e., a "connection pattern" between the series of first conductors and the series of second conductors). The crosshatch may comprise the series of first conductors and the series of second conductors. The series of second conductors may have a same number of conductors as the series of first conductors and at least one conductor in a position in the first series being connected (or not connected) to a conductor in a respective incrementally next position in the second series. The active optical networking module (or shelf controller/processor) may forward sources to the series of first conductors of a crosshatch of one of the plurality of shelves. The sources may include a grounded source and a passive power communication source that provides power and bidirectional signal communications to the passive optical networking modules.

According to some embodiments, the passive power communication source may distribute (or provide or generate) passive power to one or more memory devices on the one or more unpowered passive optical networking modules. The passive power may enable the one or more memory devices to discover its shelf address information (based upon the series of first conductors of the crosshatch) and/or its slot address information (based upon ground wiring connections within the crosshatch). The passive power communication source may be distributed (or provided or generated) based upon a dedicated power line, a signal which shares both power and input/output communication to the passive optical networking modules, or any other means of distributing passive power known to one skilled in the art (including but not limited to 1-WIRE, I2C, or other means). The passive power communication source may also provide one or more signals for communication between the active optical networking module (or shelf controller) and the passive optical networking modules.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1A-I is a flowchart of an optical networking method (and system or apparatus), according to some embodiments.

FIG. 1A-II is another flowchart of an optical networking method (and system or apparatus), according to some embodiments.

FIG. 1B-I is a system including the configurations of FIGS. 1B-II through FIG. 1E to follow, according to some embodiments.

FIG. 1B-II illustrates a timing diagram which corresponds to FIG. 1B-I, according to some embodiments.

FIG. 1B-III illustrates a shelf configuration, according to some embodiments.

FIG. 1C illustrates a more detailed view of the shelf configurations of FIGS. 1B-I through 1B-III, according to some embodiments.

FIG. 1D illustrates a system including the configurations of FIGS. 1B-I through FIG. 1C, according to some embodiments.

According to some embodiments, FIG. 1E illustrates a connection pattern (also known as "crosshatch" herein) that may create shelf addresses in accordance with FIGS. 1B-I through FIG. 1D.

According to some embodiments.

FIG. 2B (FIG. 2B-I and FIG. 2B-II, collectively) is a system block diagram using the connection pattern of FIG. 2A, according to some embodiments.

According to some embodiments.

According to some embodiments.

FIG. 4B (FIG. 4B-I and FIG. 4B-II, collectively) is a system block diagram using the connection pattern of FIG. 4A, according to some embodiments.

DETAILED DESCRIPTION OF THE INVENTION

Figure 1C:
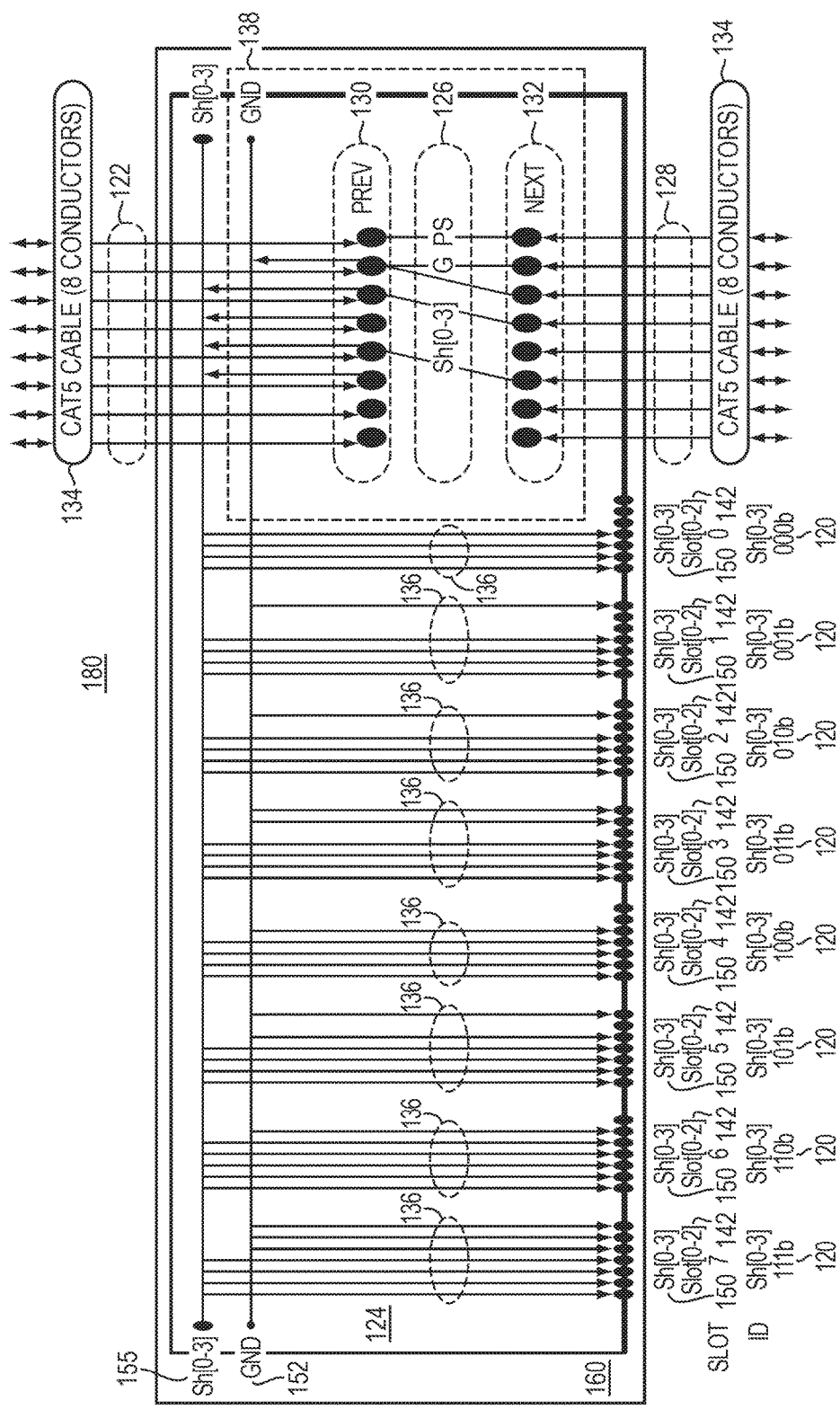

A description of example embodiments of the invention follows.

An existing inventory technique in communications systems port shelves is to place at least one controller in a shelf including passive modules. Another existing inventory technique is for the user to set the shelf number of address manually. Yet another existing inventory technique is to not inventory passive modules at all. The controller may operate system software and may be used to inventory the local passive modules and report back to network element (NE) software. A shelf controller may be redundant and may use redundant external power in its operation, resulting in a higher initial cost and continuous operational expenditures.

By contrast with existing techniques, some embodiments of the present invention may create unique shelf addresses by virtue of a crosshatch (i.e., "connection pattern" within a shelf and between conductors of a shelf). As such, some embodiments may include a method (and system or apparatus) that may enable passive optical networking modules to be placed and managed in slots in passive shelves using one or more connections to a powered (active) module. Some embodiments have no requirement for a controller within each passive shelf (also known as a shelf herein). According to some embodiments, the shelf does not need to be powered to gain passive optical networking module information. In some embodiments, one or more passive modules (also known as passive optical networking modules, passive optical modules, or unpowered passive modules herein) are grouped in a shelf, making it is easier to represent the passive modules to a user via a display (such as a graphical user interface or GUI, or other means of display) and resulting in a cost savings.

Although some existing approaches may discover passive optical networking modules, such existing approaches are lacking in that they do not discover positional information of the modules (such as slot or shelf information). Thus, in existing approaches, the type and manufacturing information (including but not limited to optical parameters/attributes) of passive optical networking modules may be unavailable to the user. In existing approaches, although the type and manufacturing information (including but not limited to optical parameters/attributes) may be provisioned by the user, its presence and type may not be directly verified by system software.

Some embodiments are applicable to passive modules that may be simple and may not require controller power, yet the NE may identify presence of one or more passive modules and corresponding manufacturing information of the one or more passive modules, including but not limited to module type, part number, version, manufacturing data, and other information. The one or more passive modules may be located in one or more slots in one or more passive shelves.

In some embodiments, attributes (including but not limited to optical or electrical attributes) of a passive module (also known as a passive optical networking module, a passive optical module, or an unpowered passive module herein) may also be retrieved. These attributes may be retrieved using software (or other means) correlated to an end-to-end optical circuit to better predict and model the optical network. When passive optical modules are built by original design manufacturers (ODMs), vendor specific information may be stored and used by engineering for repair and return of the passive module to isolate issues with the passive module.

According to some embodiments, passive modules may include dispersion compensation modules (DCM). Passive modules may also include DCM-Ns (DCMs where N may include, but is not limited to, values of 10 km, 20 km, 120 km, and a range of 10 km to 120 km). Passive modules may also perform optical multiplexing and demultiplexing (OMD), including but not limited to having x as a number of channels and y as a channel range (OMDx-y). According to some embodiments, NE software may manage the passive modules and the NE GUI may display a view of the passive shelf for users.

Some embodiments include a system (or apparatus) and method that may discover shelf and slot locations of optical passive modules in one or more non-powered shelves and slots. However, embodiments are not limited to optical passive modules. As such, some embodiments may discover shelf and slot locations of any type of module known to one skilled in the art in one or more shelves and slots through connecting the shelves in a daisy chain.

The system (or apparatus) and method may enable network element (NE) software to discover the optical passive modules and allow their management based on their physical location. Optical passive module management may include physical inventory (including but not limited to part number, serial number, version, date of manufacture, or any other physical inventory known to one skilled in the art), as well as gathering module specific operating characteristics such as insertion loss and chromatic dispersion that may aid in network planning for wavelengths traversing the optical passive module. One or more shelves may be daisy chained together using connections (including but not limited to Ethernet cables/CAT5, RJ11, DB9, DB19, or any other type of connector known to one skilled in the art) to increase the effective number of passive modules discoverable without the need for manual shelf configuration, according to some embodiments. The number of connections between shelves is not limited any may include any number of connections known to one skilled in the art. Some embodiments may include multiple instances of daisy chained passive shelves (i.e., multiple daisy chains). According to some embodiments, the multiple daisy chains may include one or more active optical modules (or shelf controllers).

Thus, a flexible and customizable system (e.g., apparatus) and corresponding method for improving flexibility and efficiency of passive module addressing (and inventory) within a passive optical network is presented. As such, some embodiments are directed to a system (e.g., apparatus) and corresponding method as follows. Some embodiments include an optical networking system (and method). According to some embodiments, a plurality of shelves may be interconnected to form a daisy chain. Each shelf may comprise one or more unpowered passive optical networking modules. The plurality of shelves may form the daisy chain by connecting a series of second conductors of each shelf to a series of first conductors of each next shelf of the daisy chain. Each shelf may have a crosshatch comprising the series of first conductors and the series of second conductors. The series of second conductors may have a same number of conductors as the series of first conductors and at least one conductor in a position in the first series being connected to a conductor in a respective incrementally next position in the second series. The system (and method) may include an active optical networking module (and/or shelf controller/processor) at a head end of the daisy chain. The active optical networking module may forward sources to the series of first conductors of a crosshatch of one of the plurality of shelves. The sources may include a grounded source and a passive power communication source.

The passive power communication source may distribute (or provide or generate) passive power to one or more memory devices on the one or more unpowered passive optical networking modules. The passive power communication source may be distributed (or provided or generated) based upon a dedicated power line, a signal which shares both power and input/output communication to the passive optical networking modules, or any other means of distributing passive power known to one skilled in the art (including but not limited to 1-WIRE, I2C, or other means). The passive power communication source may also provide one or more signals for communication between the active optical networking module (or shelf controller) and the passive optical networking modules. The one or more unpowered passive optical networking modules may be otherwise unpowered. The passive power communication source may distribute passive power of 5 milliWatts or less. According to some embodiments, the passive power communication source may distribute passive power of 5 milliWatts or less to each of the one or more memory devices individually. In some embodiments, the passive power source may distribute a total passive power of 10 milliWatts or less if distributing the passive power to two memory devices (i.e., 5 milliWatts or less per memory device).

According to some embodiments, passive power may be defined as power that is sufficient to read (or write) a memory device including but not limited to a programmable read-only memory (PROM), an electrically erasable programmable read-only memory (EEPROM), flash memory, or another memory device known to one skilled in the art.

FIG. 1A-I is a flowchart of an optical networking method (and system or apparatus) 100, according to some embodiments. The method (and system or apparatus) 100 may include an active optical networking module at a head end of the daisy chain. In other words, the method may provide 102 an active module that may supply a passive power communication source (including one or more passive power sources and one or more communication signals) and a ground (or a ground and no connect).

The method may provide 103 a plurality of shelves that may be interconnected to form a daisy chain of shelves. Each shelf may comprise one or more unpowered passive optical networking modules. The plurality of shelves may form the daisy chain by connecting a series of second conductors of each shelf to a series of first conductors of each next shelf of the daisy chain. As such, each shelf may provide 104 a crosshatch (i.e., a "connection pattern" between the series of first conductors and the series of second conductors). The crosshatch may comprise the series of first conductors (i.e., input conductors or previous conductors) and the series of second conductors (i.e., output conductors or next conductors).

The conductors may use a crosshatch configuration to set the shelf address 106 as follows. The series of second conductors may have a same number of conductors as the series of first conductors and at least one conductor in a position in the first series being connected to a conductor in a respective incrementally next position in the second series. The active optical networking module may forward sources (including but not limited to ground sources, no-connect/floating sources, one or more passive power sources, and one or more signal sources) to the series of first conductors of a crosshatch of one of the plurality of shelves. The sources may include a grounded source (and optionally a no-connect/floating source) and a passive power communication source (that may include a signal for communication and a passive power source for distributing passive power). The passive power communication source may distribute (or provide or generate) passive power to a memory device on the one or more unpowered passive optical networking modules. The passive power may be distributed in any number of ways, including but not limited to through capacitive charge with serial or multi-bit transmission, or a live/dedicated wire, or any other means known to one skilled in the art (including but not limited to through 1-WIRE or I2C).

As such, the conductors may receive 108 the passive power communication source (including passive power and signal) and the grounded source along the daisy chain from the active module. The one or more unpowered passive optical networking modules may be otherwise unpowered.

According to some embodiments of the method (and system or apparatus), the sources may further include a floating source. In addition, each of the one or more unpowered passive optical networking modules may determine 110 a shelf address based upon the shelf information of the series of first conductors of a crosshatch corresponding to the shelf. Each of the one or more unpowered passive optical networking modules may also determine 110 its address which may be a combination of the shelf address and the slot address. The slot address information may be determined based upon connections to ground. The shelf address may be determined based upon logical states of the connections within the crosshatch (i.e., whether a conductor is set to ground or no connect, which may be formed through the daisy chain).

Yet further, the active optical networking module may determine memory device information that may include a shelf address (and/or slot address) from each memory device through the passive power communication source. The unpowered passive modules may respond to signal based accesses from the active module that match their determined addresses (slot and/or shelf addresses). In addition, the passive modules may provide the memory device information (including slot address and shelf address) to the active module.

According to some embodiments of the method (and system or apparatus), the passive power communication source may distribute passive power based upon circuitry that may include at least one diode and at least one capacitor. The passive power communication source may distribute passive power of 5 milliWatts or less. Each conductor of a plurality of conductors of the first series may be connected to a conductor in a respective incrementally next position in the second series. Every other conductor of a plurality of conductors of the first series may be connected to every other respective conductor in a respective incrementally next position in the second series. In addition, each memory device may determine a unique address for each of the corresponding one or more unpowered passive optical networking modules based upon connections to the ground source (or no-connect/floating source) and the memory device information including the unique address. Yet further, the sources may be optical networking layer 1 sources.

Some embodiments include a system (or apparatus) and method to discover shelf and slot location of optical passive modules in one or more non-powered shelves and slots. Some embodiments enable network element software to discover the passive modules and allow their management based on their physical location. Module management may include physical inventory, as well as gathering module operating characteristics including, but not limited to, insertion loss and chromatic dispersion that may aid in network planning for wavelengths traversing the optical passive module. One or more shelves may be daisy chained together using connectors/connections (including but not limited to Ethernet cables/CAT5, RJ11, DB9, DB19, or any other type of connector known to one skilled in the art) to increase the effective number of passive module discoverable without the need for any manual shelf configuration.

FIG. 1A-II is a flowchart of an optical networking method (and system or apparatus) 111, according to some embodiments. Example embodiments of the present invention include an optical networking system (e.g., apparatus) and corresponding method as follows. According to some embodiments, a plurality of shelves may be interconnected 112 to form a daisy chain. Each shelf may comprise 112 one or more unpowered passive optical networking modules. The system (and method) may include an active optical networking module at a head end of the daisy chain 114. Some embodiments may include a shelf controller (processor), which may be part of or separate from the active optical networking module. Some embodiments may comprise 114 a passive power communication source within the active optical networking module (or shelf controller/processor) at a head end of the daisy chain.

The passive power communication source may be configured to distribute (or provide or generate) 116 passive power to one or more memory devices on the one or more unpowered passive optical networking modules daisy chained within the plurality of shelves of the method (or system). The one or more unpowered passive optical networking modules may be otherwise unpowered. The one or more memory devices may provide respective communication 118 as a function of interconnections of the daisy chaining and passive power distributed by the passive power communication source.

Figure 1D:
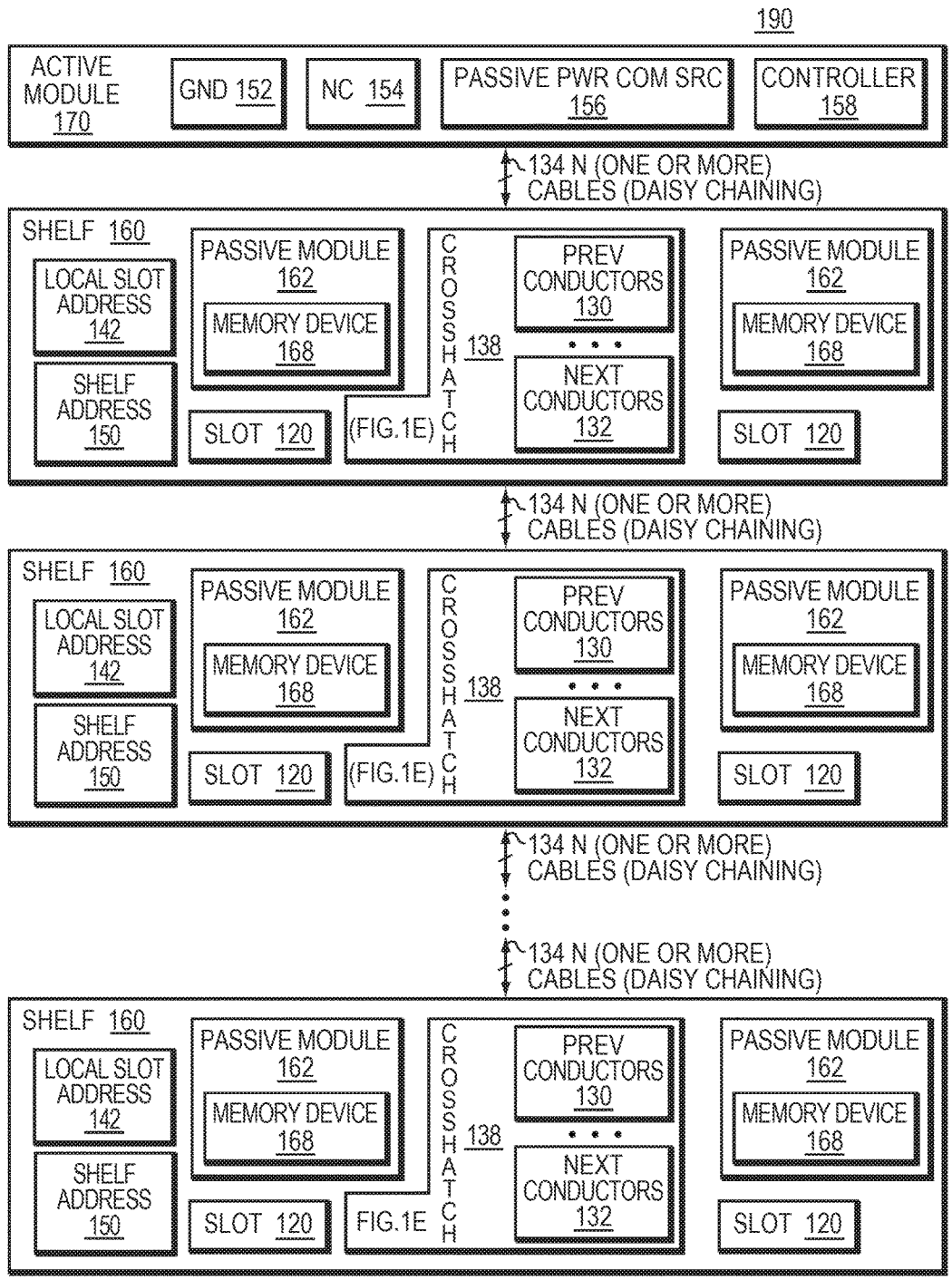
Figure 1E:
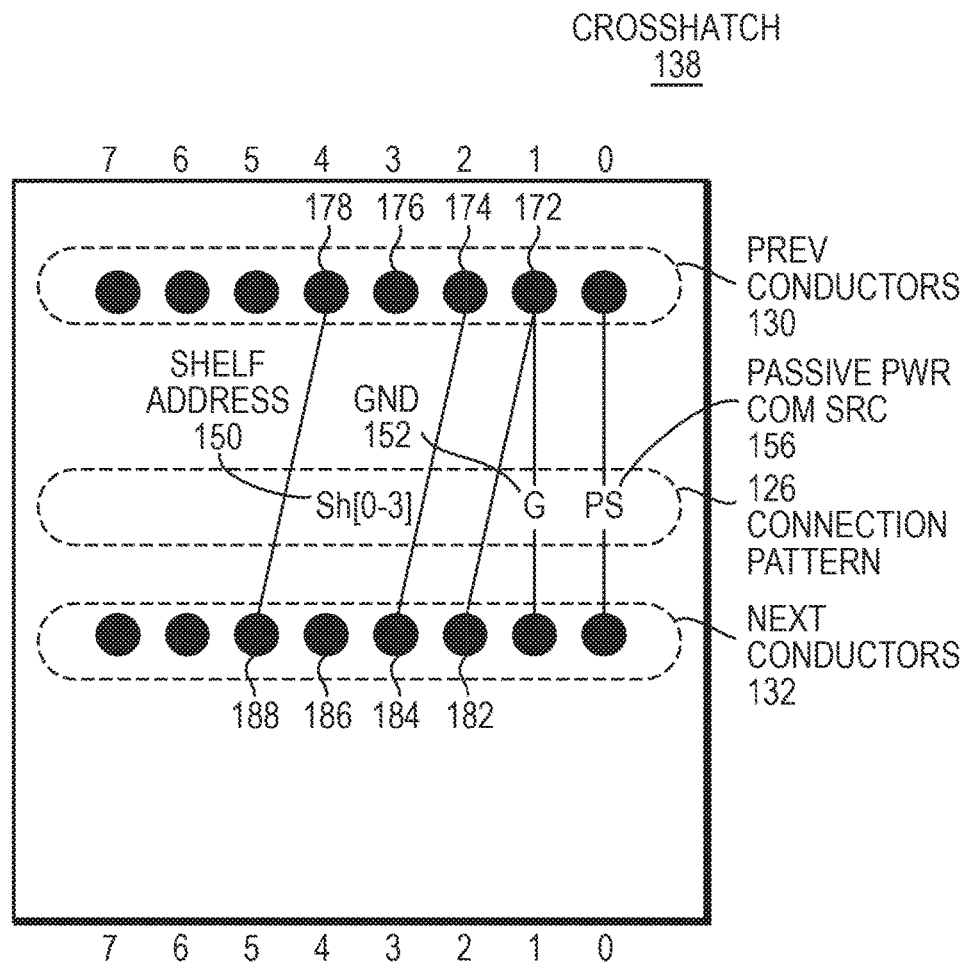

FIG. 1B-I is a system (and method or apparatus) 140 including the configurations of FIGS. 1B-II through FIG. 1E to follow, according to some embodiments. According to some embodiments, a plurality of shelves may be interconnected to form a daisy chain (collectively, elements 160 and 170 of FIG. 1B-I). Each shelf 160 may comprise one or more unpowered passive optical networking modules 162. The system (and method) may include an active optical networking module 170 at a head end of the daisy chain. Some embodiments may include a shelf controller (processor) 158, which may be part of or separate from the active optical networking module 170. Some embodiments may comprise a passive power communication source 156 within the active optical networking module 170 (or shelf controller/processor 158) at a head end of the daisy chain.

The passive power communication source 156 may be configured to distribute (or provide or generate) passive power 192 to one or more memory devices 168 on the one or more unpowered passive optical networking modules 162 daisy chained within the plurality of shelves 160 of the method (or system) through one or more connections 196. The one or more unpowered passive optical networking modules 162 may be otherwise unpowered.

According to some embodiments, the one or more memory devices 168 may provide respective communication 194 as a function of interconnections 150 (the shelf address, also forming the unique address 136 of the passive module 162) of the daisy chaining 134 and passive power 192 distributed by the passive power communication source 156 through one or more connections 196. In addition, some embodiments may provide respective communication 194 as a function of a unique address 136 formed by the local the local slot address 142 and the interconnections 150 (shelf address) of the daisy chaining 134 together, the respective communication 194 also being provided based on the passive power 192 distributed by the passive power communication source 156.

According to some embodiments, the one or more memory devices 168 may provide respective communication 194 as a function of passive power 192 distributed by the passive power communications source, communications 194, and interconnections 196 and a unique address 136 formed by the combination of the shelf address 150 and local slot address 142. The shelf address 150 is a unique identifier formed by daisy chaining connections 134 and passive power between one or more shelves.

FIG. 1B-II illustrates a timing diagram which corresponds to FIG. 1B-I, according to some embodiments. As illustrated in the timing diagram 143 of FIG. 1B-II, the passive power communication source 156 (of FIG. 1B-I) may provide address information 145 to the one or more memory devices 168 (of FIG. 1B-I) upon a start of frame (SOF) 144. Next, after an (optionally programmable) delay 146, the passive power communication source 156 (of FIG. 1B-I) may read data 147 from one or more of the memory devices 168 (of FIG. 1B-I), when the address information 145 matches the unique address of the corresponding memory device (the unique address of the corresponding memory device being formed from its corresponding shelf address 150 and optionally also from a combination of its corresponding shelf address 150 and its corresponding local slot address 142). In addition, as known to one skilled in the art, control functionality (not shown in FIG. 1B-II, to control read or write access to the memory devices 168) may be implemented before or after the address 145 or data 147. In some embodiments, the data 147 may comprise write data (data being written to the memory device 168). In some embodiments, the data 147 may comprise read data (data being read from the memory device 168).

According to some embodiments, the passive power communication source 156 (of FIG. 1B-I) may perform reads, writes, or other types of communication-based accesses to one or more of the memory devices 168 (of FIG. 1B-I). Some embodiments are not so limited to the timing diagram of FIG. 1B-II, and the passive power communication source 156 may access the memory devices 162 using any timing diagram method known to one skilled in the art, including but not limited to time-division-multiplexing (TDM), space-division-multiplexing (SDM), frequency-division-multiplexing (FDM), code-division-multiplexing (CDM), any form of timing used for a passive power communication source (including but not limited to 1-WIRE timing or I2C timing), or any other form of timing known to one skilled in the art.

FIGS. 1B-III through FIG. 1D illustrates shelf configurations and a corresponding system, in accordance with some embodiments. FIG. 1B-III illustrates a shelf configuration, according to some embodiments. FIG. 1C illustrates a more detailed view of the shelf configuration of FIG. 1B-III, according to some embodiments. FIG. 1D illustrates a system including the configurations of FIGS. 1B-III through 1C, according to some embodiments.

According to some embodiments, as illustrated in the shelf configuration 150 of FIG. 1B-III, a shelf 160 may include one or more slots 120. Each shelf 160 may include one or more passive optical networking modules. Although FIG. 1B-III illustrates eight slots 120, embodiments are not so limited and may include one or more slots 120. In FIG. 1B-III, eight slots 120 may be included on a shelf 160. Each slot may communicate an address and other signals (including, but not limited to, passive power communication, ground, and unconnected/floating signals) 136 across a backplane 124 through a set of first (previous) connectors (or conductors) 130. In FIG. 1B-III, the first (previous) conductors 130 may receive an address signal and other signals 122 from a source module communications port (COMM port) or previous shelf 160, as illustrated in FIG. 1D to follow.

As illustrated in FIG. 1B-III, within the crosshatch 138, the first conductors 130 and second conductors 132 may form a connection pattern 126 to propagate signals between them. Some embodiments may propagate signals (e.g., including write instructions, read instructions, or any other type of signal or instruction transmitted along one or more physical connections known to one skilled in the art) in either direction (between first and second conductors), i.e., from first conductors 130 to second conductors 132 and to a next shelf 128, or from second conductors 132 to first conductors 130 and to a previous shelf or COMM port 122.

As illustrated in the shelf configuration 180 of FIG. 1C, a shelf 160 may have eight slots 120 (but is not so limited) and one or more backplanes 124 where each slot 120 may be uniquely identified 136 by connecting, or leaving unconnected pins to ground 152. Each module (including but not limited to passive optical networking modules), when inserted into the shelf slot 120, may read these pins 152 to determine the slot 120 for which it is inserted.

Table I to follow illustrates how eight unique slot based addresses may be created, according to some embodiments.

TABLE I

Slot Addressing

| Slot Number | Slot.2 | Slot.1 | Slot.0 |
|---|---|---|---|
| 1 | NC | NC | NC |
| 2 | NC | NC | GND |
| 3 | NC | GND | NC |
| 4 | NC | GND | GND |
| 5 | GND | NC | NC |
| 6 | GND | NC | GND |
| 7 | GND | GND | NC |
| 8 | GND | GND | GND |

As illustrated in FIG. 1C, the shelf 160 may receive a shelf address 150 from its first series of conductors 130. In other words, as illustrated in FIG. 1C, each of the one or more unpowered passive optical networking modules (162 of FIG. 1D to follow) may determine a shelf address 150 based upon the series of first conductors 130 of a crosshatch 138 corresponding to the shelf 160.

As collectively illustrated in FIGS. 1C-1D, a first series of conductors 130 may in turn receive (or transmit) the shelf address 150 via signals 122 received from (or transmitted to) an active module 170 (as illustrated in FIG. 1D) or another shelf 160 (as illustrated in FIG. 1D) through one or more cables 134 (including, but not limited to, one or more Category 5, or CAT5 cables). As illustrated in FIG. 1C, likewise, the second series of conductors 132 may in turn receive (or transmit) a modified form of the shelf address 150 (modified according to the connection pattern or crosshatch of element 126) via signals 128 (of FIG. 1C) transmitted to (or received from) an active module 170 (as illustrated in FIG. 1D) or another shelf 160 (as illustrated in FIG. 1D) through one or more cables 134 (including but not limited to one or more CAT5 cables). In this manner, some embodiments may construct unique system addresses 136 for each slot that are based upon a shelf address 150 and slot number/address 142 of each slot 120.

FIG. 1D illustrates a system view 190 of the shelves 160 of FIGS. 1B-I through 1C, in which a plurality of shelves 160 may be daisy chained together using cables 134. As also illustrated in FIG. 1D, in some embodiments, an active optical networking module at a head end 170 of the daisy chain may intercommunicate with the plurality of shelves 160 via cables 134.

According to some embodiments, as illustrated in FIGS. 1A-D, the method and system (or apparatus) may include various features. As illustrated in FIG. 1D, some embodiments may include a passive power communication source (including but not limited to a 1-WIRE passive power source, or other type of passive power communication source) 156 for reading (or writing) otherwise unpowered memory devices 168 on one or more passive modules 162 located in the slots 120 of shelves 160. The passive power communication source 156 may also provide passive power including but not limited to power of 5 milliWatts or less, or power distributed based upon circuitry that may include at least one diode and at least one capacitor to the otherwise unpowered memory devices 168. In other words, the passive power communication source 156 may distribute passive power based upon circuitry (located on the active module 170, or alternatively on the passive modules themselves 162) that may include at least one diode and at least one capacitor. Also, in other words, the passive power communication source 156 may distribute passive power of 5 milliWatts or less (based upon a means of distribution located on the active module 170, or alternatively on the passive modules themselves 162).

The passive power communication source 156 may communicate to and from (i.e., in a bidirectional manner) the otherwise unpowered memory devices 168 on one or more passive modules 162 located in the slots 120, through cables 134 and conductors 130, 132 of crosshatches 138 as illustrated in FIG. 1D. The passive power communication source 156 may be located on the active module 170 (or another location). The otherwise unpowered memory devices 168 may include but are not limited to programmable read-only memory (PROM), an electrically erasable programmable read-only memory (EEPROM), or other memory devices.

The active optical networking module 170 may determine memory device information that may include a shelf address from each memory device 168 through the passive power communication source 156. As illustrated in FIGS. 1C-D, each memory device 168 may determine a unique address for each of the corresponding one or more unpowered passive optical networking modules 162 based upon connections to the ground source 152 and the memory device information including the unique address.

As illustrated in the system (or daisy chain) 190 of FIG. 1D, some embodiments may include the following:

The active module 170 may include a controller 158 that may send (and receive) passive power communication source (e.g., 1-WIRE) 156 messages on the "PS" via a conductor (on or more of the first conductors 130 or second conductors 132) on one or more cables 134.

The controller 170 may provide ground "G" 152 on a conductor 130, 132 on one or more cables 134.

The controller 170 may send ground "G" 152 or no-connect "NC" 154 along conductors 130, 132 on one or more cables 134. The ground 152 or no-connect 154 may form the shelf address of the first shelf 160. For each shelf 160, based upon its received shelf address at its "Previous" 130 connection, the corresponding crosshatch 138 may create an address for its "Next" 132 connection by propagating ground, no-connect, or both ground and no-connect along its crosshatch 138.

Each shelf 160 may provide a "slot address" by grounding or no connecting pins across a backplane to each passive module 162 pluggable into the shelf 160.

Each shelf 160 may provide a "shelf address" to each passive module 162 plugged into a shelf.

Each shelf may include a "COMM" port connection (or crosshatch) 138 which may include a "Previous" 130 and "Next" 132 connection (e.g., sets of conductors) designed to connect to previous and next shelves 160 in a daisy chain 190.

A shelf 160 may have fixed interconnection between its "Previous" 130 and "Next" 132 conductors and may be designed to create unique shelf addresses by propagating ground 152 or no connect 154 between the previous 130 and next 132 conductors.

Devices may be plugged into a shelf slot 120 that may use shelf and slot Addresses to form a system wide unique Address.

Computer instructions (e.g., computer-implemented software) on the controller 158 may detect devices plugged into a shelf 160 and determine the unique address of the shelf 160.

Computer instructions (e.g., computer-implemented software) on the controller 158 may use a unique address to infer a location of a shelf 160 and slot 120 location for a passive optical networking module 162 such that the physical location of the memory devices 168 may be identified and managed by the controller 158 using a command line identification or via a graphical user interface (GUI) display associated with the active module 170.

Computer instructions (e.g., computer-implemented software) on the controller 158 may read operational parameters stored on the memory devices 168 and use these operational parameters for improved modeling of optical circuits on the passive optical networking modules 162 which may intercommunicate with the memory devices 168.

As illustrated in FIG. 1D, passive power source communication technology (including but not limited to capacitive charge technology, serial line communication technology, or any other passive power source communication technology known to one skilled in the art, including but not limited to 1-WIRE or I2C) may utilize one or more signals along which messages may be sent (and received) continually from the controller 158. The passive power communication source 156 may include remote devices (optionally located on the passive power communication source 156) that may capacitively couple to the signal and may create a voltage where a memory device (e.g., EEPROM) 168 and basic micro controller located on a passive power module 162 may operate and respond to such passive power communication source (1-WIRE) 156 messages. In this fashion, the passive modules 162 and memory devices 168 are considered "passive" because they may require no other power source to function, other than the passive power communication source 156. According to some embodiments, the net load on the passive power communication source 156 signal may be less than 5 milliWatts on the controller 158.

Some embodiments may include three components: a shelf address 150 and a slot address 142 (collectively, element 136 of FIG. 1C), and a daisy chain (element 190 of FIG. 1D). The crosshatch 138 may formulate unique addresses for shelves 160 when the daisy chain is continued between shelves 160. In other words, the daisy chain 190 may form unique shelf and slot addresses 150, 142 (collectively, element 136 of FIG. 1C) when multiple shelves 160 are daisy chained together.

Referring back to FIGS. 1C-D, the shelf 160 also may have backplane pins (155 for shelf and 152 for ground used for slot) that may be shared across all modules 162 in the shelf 160 to denote a shelf address 150 and an address of a slot 142 (or both shelf and slot addresses together, collectively element 136). For example a 3 shelf daisy chain (element 190) may allocate at least 2 pins for the shelf address; binary bits 00b, 01b, and 11b, respectively. The shelf address may be set and propagated through shelves 160 in the multi-shelf daisy chain 190 by propagating a ground signal 152, or no connect (NC) 154, or both ground signal 152 and no connect (NC) 154.

As illustrated in FIGS. 1C-D, the passive power communication source signal protocol 156 may include a signal protocol that may be used to query memory devices 168 (e.g., EEPROMS) on each passive module 162 on a given slot 120 within a shelf 160. Herein, the "G" signal refers to ground 152. The shelf addressing pins may be represented as Sh[0-3] (element 150 of FIG. 1C). The shelf daisy chain 190 may be formed by connecting both "PS" (156) and "G" (152) directly through to successive shelves 160. These two signals may be constant in some embodiments.

As illustrated collectively in FIGS. 1B-I through 1D, the shelf addresses 150 may be constructed differently depending on the controller 158 associated with the passive power communication source 156 and termination 126 of unused conductors in the cable 134 connecting it to a shelf 160. Some embodiments include CAT5 cables 134 with 8 conductors in the first set 130 and 8 conductors in the second set 132. In some embodiments, address resolution of each memory device 168 on the passive module 162 may be 7 bits. According to some embodiments, the procedure of creating unique addresses may be extended, if the cable has more than 8 conductors per set (130, 132), or if the memory device 168 on the passive module 162 supports more than 7 addressing bits.

In some embodiments, the shelf address 150 may comprise 4 bits. The shelf addressing may be taken from the "previous" 130 side of the daisy chain. Some embodiments have 8 shelf slots 160 and a shelf address 150 of 4 (or 3) bits. The value of the shelf address 150 may vary depending on the controller 158 usage of the non-core (passive power communication source 156 and ground 152) signals of the passive power communication source protocol (e.g., 1-WIRE protocol).

FIG. 1E also illustrates crosshatches 138 with a connection pattern 126. Each crosshatch 138 may be located within a given shelf 160 (of FIGS. 1B-III through 1D). As illustrated in FIG. 1E, a crosshatch 138 may provide a connection pattern 126 between previous 130 and next 132 conductors. As illustrated in FIG. 1E, the connection pattern 126 may include a shelf address 150, a ground 152, and a passive power communication source (e.g., 1-WIRE) 156 respectively. Embodiments of FIGS. 1B-III through 1D correspond to crosshatch 138 of FIG. 1E.

According to some embodiments, as illustrated in FIG. 1E, the crosshatch 138 may build out the addressing 126 by connecting a conductor (Prev-1, element 172) in one position of the first series 130 to a conductor (Next-2, element 182) in a respective incrementally next position of the second series 132. As illustrated in FIG. 1E, in some embodiments, a conductor 176 (Prev-3) of the first series 130 may be left unconnected to another conductor 186 (Next-4) in a respective incrementally next position of the second series 186. As illustrated in FIG. 1E, in some embodiments, conductors 174, 178 (Prev-2 and Prev-4 respectively) of the first series 130 may connect to conductors 184, 188 (Next-3 and Next-5 respectively) to propagate ground or no connect signals (or both ground and no connect signals) to successive shelves. In other words, as illustrated in FIG. 1E, each conductor of a plurality of conductors of the first series 130 may be connected to a conductor in a respective incrementally next position in the second series 132. And as also illustrated in FIG. 1E, every other conductor of a (different) plurality of conductors of the first series 130 may be connected to every other respective conductor in a respective incrementally next position in the second series 132.

According to some embodiments, the interconnect of FIG. 1E allows shelf addressing by adding a bit of constant state (i.e., shifting a bit by one) to the Shelf Addressing pins Sh[0-3] 150. In addition, when considering the system view of FIGS. 1D-E, each conductor of a plurality of conductors of the first series 130 may be connected to a conductor in a respective incrementally next position in the second series 132.

Figure 2A:
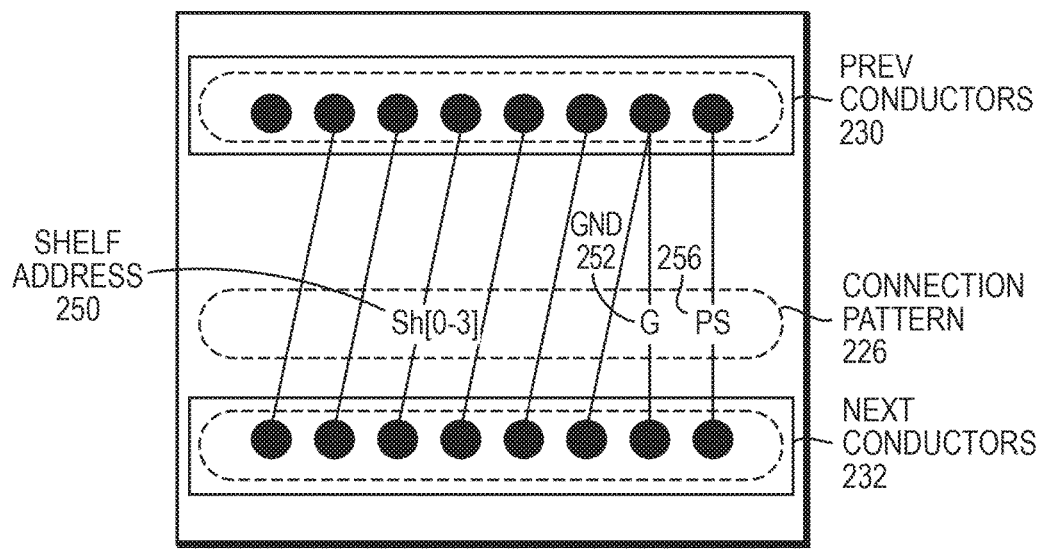
FIG. 2A illustrates a connection pattern that may create shelf addresses in accordance with FIG. 2B (FIG. 2B-I and FIG. 2B-II, collectively) by propagating ground (i.e., ground source).
Figure 3A:
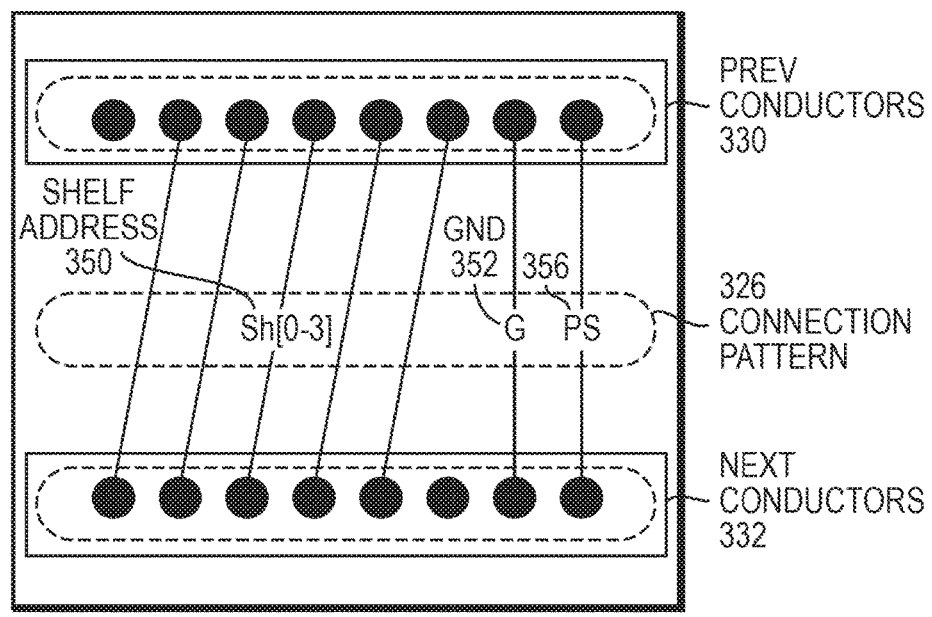
FIG. 3A illustrates a connection pattern that may create shelf addresses in accordance with FIG. 3B (FIG. 3B-I and FIG. 3B-II, collectively) by propagating no-connect (also known herein as no connect, or floating source).
Figure 3B:
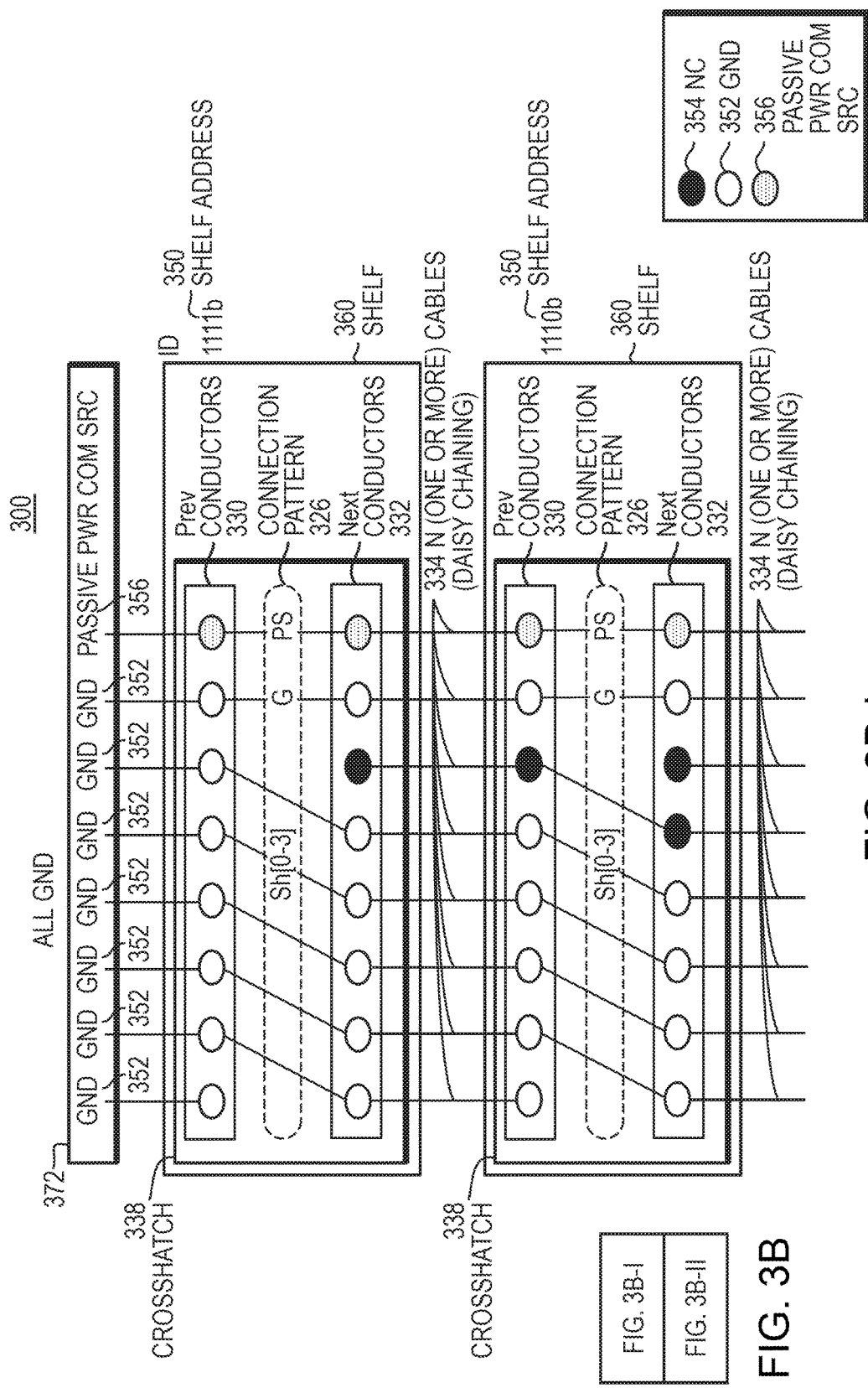
FIG. 3B (FIG. 3B-I and FIG. 3B-II, collectively) is a system block diagram using the connection pattern of FIG. 3A, according to some embodiments.
Figure 4A:
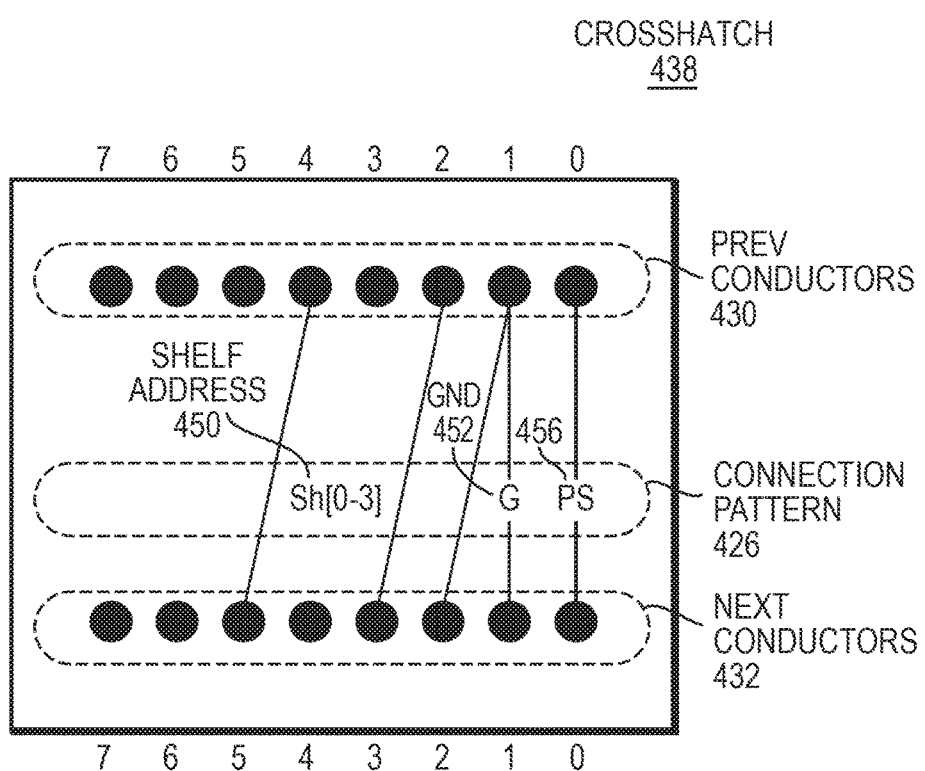
FIG. 4A illustrates a connection pattern that may create shelf addresses in accordance with FIG. 4B (FIG. 4B-I and FIG. 4B-II, collectively) by propagating ground and no-connect. According to some embodiments, FIGS. 4A-B may apply when the active module (at a head end of a daisy chain of passive modules) has fixed shelf address pins that may be either no-connect or ground.

FIGS. 2A, 3A, 4A also illustrate crosshatches 238, 338, 438, respectively, of differing connection patterns 226, 326, 426, respectively. Each of the crosshatches 238, 338, 438, respectively, may be located within a given shelf 260, 360, 460 (of FIGS. 2B, 3B, 4B, respectively). As illustrated in FIGS. 2A, 3A, and 4A, a crosshatch 238, 338, 438 may provide a connection pattern 226, 326, 426 between previous 230, 330, 430 and next 232, 332, 432 conductors. As illustrated in FIGS. 2A, 3A, and 4A, the connection pattern 226, 326, 426, respectively, may include a shelf address 250, 350, 450, respectively, a ground 252, 352, 452, respectively, and a passive power communication source (e.g., 1-WIRE) 256, 356, 456, respectively. Embodiments of FIGS. 2B, 3B, and 4B correspond to crosshatches 238, 338, 438, respectively, of FIGS. 2A, 3A, and 4A, respectively. Like FIG. 1E, FIGS. 2A, 3A, and 4A also illustrate instances where the crosshatch 238, 338, 438 may build out the addressing 226, 326, 426, respectively, by connecting (or not connecting), as illustrated in FIGS. 2A, 3A, 4A, one or more conductors in position(s) of the first series 230, 330, 430, respectively, to conductor(s) in respective incrementally next positions of the second series 232, 332, 432, respectively.

Some embodiments, shown in FIGS. 2B, 3B, and 4B, may include systems 200, 300, 400, respectively, with a constant (or predictable) head end. In such embodiments, either "All Gnd" (372 of FIG. 3B, 472 of FIG. 4B), or "All NC" (270 of FIG. 2B, 470 of FIG. 4B), and a mechanism of Prev-N (Sh-X) to Prev-(N+1) (Sh-(X+1)), as illustrated in FIGS. 2B, 3B, 4B, may be used to create and propagate unique Shelf Addresses (250, 350, 450, respectively).

The system 200 of FIG. 2B (FIG. 2B-I and FIG. 2B-II, collectively) may include one or more instances of the crosshatch 238 of FIG. 2A. In other words, the crosshatch 238 of FIG. 2A may provide a connection pattern 226 that is used in FIG. 2B. According to some embodiments of the system (and method) 200, the controller sources 270 may include a floating voltage source 254 (unconnected, not connected, or NC) in addition to a ground source 252 and passive power communication source 256 (that may include a communication signal and passive power). One or more of the sources 252, 254, 256 may be optical networking layer 1 sources.

As illustrated in the system 200 of FIG. 2B, when the controller 270 of the active module leaves non-core signals floating (unconnected, not connected, or NC) 254, then unique shelf addressing 250 for each shelf 260 may be created by propagating ground 252 and the floating signal 254 between the previous 230 and next 232 connections (including but not limited to COMM connections, or other types of electrical or optical connections) across each crosshatch 238 of each shelf 260. As illustrated in FIG. 2B, shelves 260 may be cabled together using connections (including but not limited to using standard CAT5 cables, or other electrical or optical cables) 234. As shown in FIG. 2B, the connection patterns 226 may create a unique shelf address (shelf identifier or shelf ID) 250 for each shelf 260. As illustrated in FIG. 2B, according to some embodiments, 5 unique Shelf Addresses (ID) 250 may be created when 4 shelf addressing bits (element 250 of corresponding FIG. 2A) are allocated. Also illustrated in FIG. 2B is the passive power communication source (e.g., 1-WIRE) 256 which may be propagated between shelves 260 to communicate with and provide (distribute) passive power to memory devices on each shelf 260.

The system 300 of FIG. 3B (FIG. 3B-I and FIG. 3B-II, collectively) may include one or more instances of the crosshatch 338 of FIG. 3A. In other words, the crosshatch 338 of FIG. 3A may provide a connection pattern 326 that is used in FIG. 3B. As illustrated in the system 300 of FIG. 3B, when the controller 372 grounds 352 non-core signals (G), then unique shelf addressing 350 for each shelf 360 may be created by propagating no-connect 354 between the previous 330 and next 332 connections (including but not limited to COMM connections, or other types of electrical or optical connections) across each crosshatch 338 of each shelf 360. As illustrated in FIG. 3B, shelves 360 may be cabled together using connections (including but not limited to using standard CAT5 cables, or other electrical or optical cables) 334. As shown in FIG. 3B, the connection patterns 326 may create a unique shelf address (shelf identifier or shelf ID) 350 for each shelf 360. As illustrated in FIG. 3B, according to some embodiments, 5 unique Shelf Addresses (ID) 350 may be created when 4 shelf addressing bits (element 350 of corresponding FIG. 3A) are allocated.

Also, illustrated in FIG. 3B is the passive power communication source 356 (that may include a communication signal and passive power) which may be propagated between shelves 360 to communicate with and provide (distribute) power to memory devices on each shelf 360. Further illustrated in FIG. 3B is a floating connection (i.e., ungrounded, at a floating voltage) 354 between the shelves 360. One or more of the sources 352, 356 may be optical networking layer 1 sources.

As illustrated in the system of 400 FIG. 4B (FIG. 4B-I and FIG. 4B-II, collectively), some embodiments may include one or more controllers 470 with "No Connect" 454 and/or one or more controllers 472 with "Ground" 452. However, as illustrated in FIG. 4B, in some embodiments, fewer shelf addresses may be available for address propagation (as compared with the system 300 of FIG. 3B or the system 200 of FIG. 2B) due to propagation of both ground and no connect. As such, FIG. 4B illustrates a system 400 that may include one or more instances of the crosshatch 438 of FIG. 4A. In other words, the crosshatch 438 of FIG. 4A may provide a connection pattern 426 that is used in FIG. 4B.

As illustrated in the left hand side of FIG. 4B, the system 400 may include a controller 472 that may ground 452 non-core signals (G), and unique shelf addressing 450 may be created for the corresponding shelves 460 that may be created by propagating ground 452 between the previous 430 and next 432 connections (including but not limited to COMM connections, or other types of electrical or optical connections) across each crosshatch 438 of each shelf 460 through cables 434.

As illustrated in the left hand side of FIG. 4B, when addressing is based on an "All Gnd" controller 472, the first shelf address 450 in a daisy chain of shelves 460 may be 1111b (1111 binary) and successive shelves 460 may have shelf addresses of 1011b (1011 binary) and 0011b (0011 binary), respectively. However, according to some embodiments, addressing is not so limited. According to some embodiments, a "1" may represent a ground and a "0" may represent a no connect. In other embodiments, a "0" may represent a ground and a "1" may represent a no-connect.

As illustrated in the right hand side of FIG. 4B, the system 400 may include a controller 470 that may leave non-core signals at a floating voltage 454, thereby creating shelf addressing 450 for the corresponding shelves 460 that may be created by propagating ground 452 between the previous 430 and next 432 connections (including but not limited to COMM connections, or other types of electrical or optical connections) across each corresponding crosshatch 438 of each shelf 460 through cables 434.

Also as illustrated in the right hand side of FIG. 4B, when addressing is based on an "All NC" controller 470, the first shelf address 450 in a daisy chain of shelves 460 may be 0000b (0000 binary) and successive shelves 460 may have shelf addresses of 0001b (0001 binary) and 0011b (0011 binary), respectively. One or more of the sources 452, 454, 456 may be optical networking layer 1 sources.

As illustrated in FIG. 4B, shelves 460 may be cabled together using connections (including but not limited to using standard CAT5 cables, or other electrical or optical cables) 434. As shown in FIG. 4B, the connection patterns 426 may create a unique shelf address (shelf identifier or shelf ID) 450 for each shelf 460. As illustrated in FIG. 4B, according to some embodiments, 4 unique Shelf Addresses (ID) 450 may be created when 3 shelf addressing bits (element 450 of corresponding FIG. 4A) are allocated. Also illustrated in FIG. 4B is the passive power communication source (e.g., 1-WIRE) 456 which may be propagated between shelves 460 to communicate with and provide (distribute) power to memory devices on each shelf 460.

According to some embodiments, shelf addressing propagation may be implemented using shelf interconnectivity having 8 conductors and "All Gnd" and/or "All NC" head end schemes. In such embodiments, 3 or more daisy chained shelves may be supported using 4 shelf addressing bits. According to some embodiments, 5 shelves may identify 4 shelf addressing conductors/bits. However, some embodiments are not so limited and may include other combinations of ground and no-connect head end schemes, as well as more or less than 8 conductors. Generically, the method (and system) herein for shelf addressing may support N+1 daisy chained shelves using N addressing bits with an "All Gnd" or "All NC" head end.

Referring back to FIGS. 1B-I through 1E, each passive module 162 in the daisy chain 190 may have a unique address 136 formed by the Slot ID pins 152 set by shelf backplane (forming the slot address 142) and the shelf address 150 built via the daisy chain 190 and connected to each passive module 162 forming a unique address 136 (including but not limited to a 7-bit address, the 7-bit address having more or less bits in some embodiments). Network element (NE) software located on the head end 170 may discover a passive module 162 with its unique address 136 and may associate that passive module 162 with both a passive shelf 160 and slot 120.

A NE may have multiple instances of passive module shelf daisy chains that may be managed, as illustrated by FIG. 1D. Some embodiments may enumerate each passive shelf 160 beginning with a fixed number in a passive shelf number space. Some embodiments may model passive shelves 160 as sub-slots of a passive module, forming one or more head end connections to the NE (170).

Referring back to FIG. 1D, the passive power communication source 156 may include, but is not limited to a 1-WIRE communication source, an inter-integrated circuit (I2C) communication source, or another type of passive power communication source 156. The memory devices 168 are compatible with the passive power communication source 156.

An advantage of some embodiments is that they enable unique identification of memory devices (such as EEPROMs). As such, modules may be discovered and continuously inventoried. The memory devices may include information regarding the passive device, type, and applicable wavelengths. A network element (NE), when provisioning services, may cross-connect a transponder module to the passive device and the passive device DWDM interface to an external degree. The memory device may also include optical parameters such as insertion loss and chromatic dispersion. Such data in conjunction with the association of a passive device with an optical circuit may help network planners better manage and end-to-end optical circuit which may reduce amplification or regeneration nodes creating a more cost efficient solution.

Figure 5:
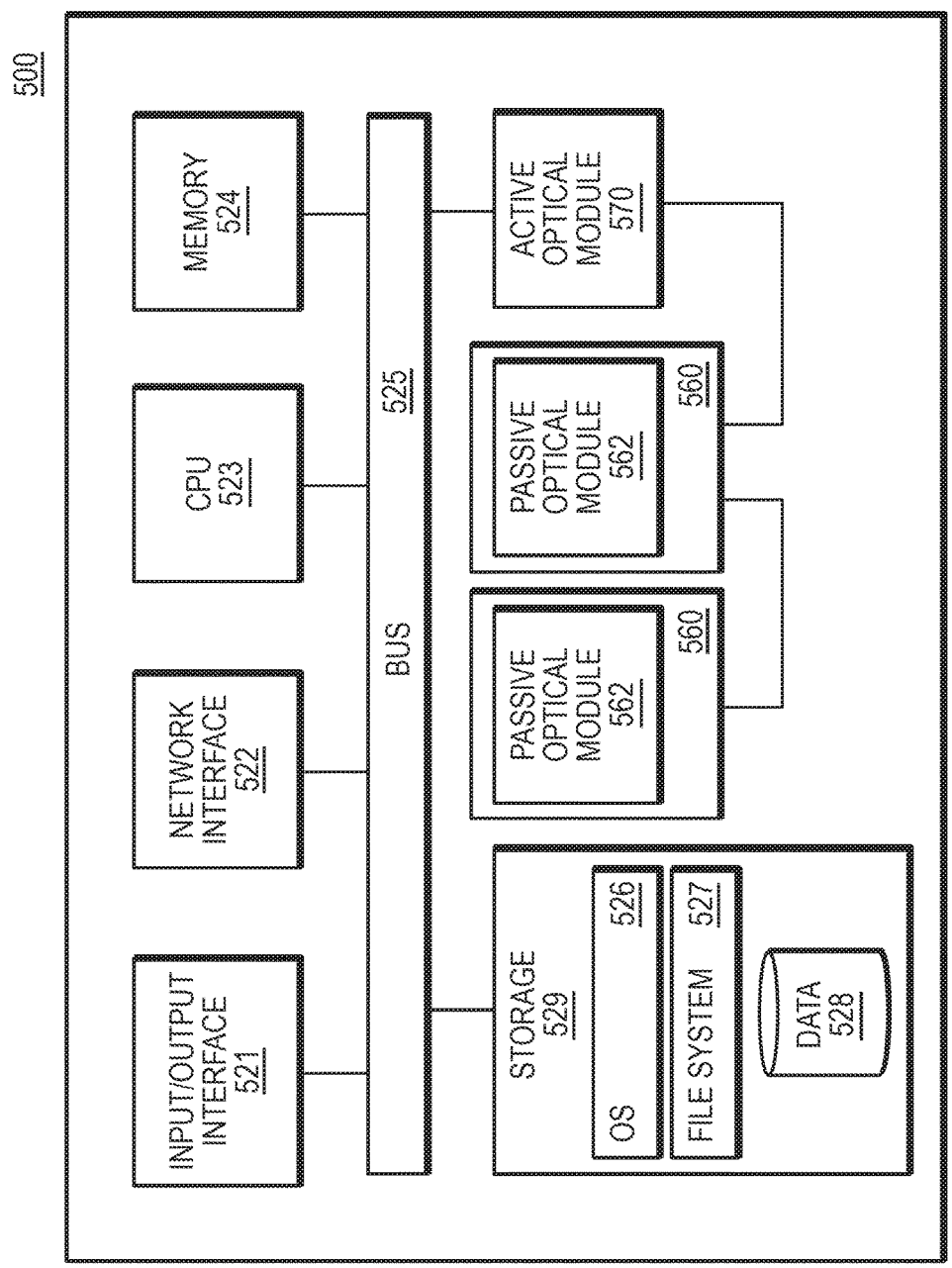
FIG. 5 is a high level block diagram view of an optical computer network environment in which some embodiments may be implemented.

FIG. 5 is a high level block diagram view of a computer network environment in which some embodiments may be implemented. According to some embodiments, FIG. 5 is also a high level block diagram of a system 500 that may provide a plurality of shelves 560 that may be interconnected to form a daisy chain of shelves 560. Each shelf 560 may comprise one or more unpowered passive optical networking modules 562. Each shelf 560 may be accessible via an active optical module 570 that connects to a bus 525 and/or input/output interface 521. The plurality of shelves 560 may form the daisy chain by connecting a series of second conductors of each shelf 560 to a series of first conductors of each next shelf 560 of the daisy chain of shelves 560. Each shelf 560 may have a crosshatch comprising the series of first conductors and the series of second conductors.

The conductors may use a crosshatch configuration as follows. The series of second conductors may have a same number of conductors as the series of first conductors and at least one conductor in a position in the first series being connected to a conductor in a respective incrementally next position in the second series. The system 500 may include an active optical networking module at a head end 570. The active optical networking module 570 may forward sources to the series of first conductors of a crosshatch of one of the plurality of shelves 560. The sources may include a grounded source and a passive power communication source. The passive power communication source may distribute (or provide or generate) passive power to a memory device that may be located on the one or more unpowered passive optical networking modules 562 (or, alternatively, the memory device may be located remotely 524 with respect to the one or more unpowered passive optical networking modules 562). As such, the conductors may receive the passive power communication source and the grounded source along the daisy chain from the active module 570. The one or more unpowered passive optical networking modules 562 may be otherwise unpowered.

According to some embodiments of the system 500, the sources may further include a floating source. In addition, each of the one or more unpowered passive optical networking modules 562 may determine a shelf address based upon the series of first conductors of a crosshatch corresponding to the shelf 560. Yet further, the active optical networking module 562 may determine memory device information that may include a shelf address from each memory device through the passive power communication source.

According to some embodiments of the system 500, the passive power communication source may provide/distribute passive power based upon any passive power known in the art (including but not limited to circuitry that may include at least one diode and at least one capacitor). The passive power communication source may distribute passive power of 5 milliWatts or less to each memory device. Each conductor of a plurality of conductors of the first series may be connected to a conductor in a respective incrementally next position in the second series. Every other conductor of a plurality of conductors of the first series may be connected to every other respective conductor in a respective incrementally next position in the second series. In addition, each memory device may determine a unique address for each of the corresponding one or more unpowered passive optical networking modules 562 based upon connections to the ground source and the memory device information including the unique address. Yet further, the sources may be optical networking layer 1 sources.

According to some embodiments, the system 500 may comprise a bus 525. The bus 525 may be a connection between the various components of the system 500. Connected to the bus 525 may be an input/output interface 521 for connecting various input and output devices, such as a keyboard, mouse, display, speakers, etc. to the system 500. The CPU 523 may use the active optical module 570 or the input/output interface 521 in order to read (or write, or any type of access known to one skilled in the art) memory devices located on the passive optical modules 562.

Further connected to the bus 525 may be a network interface 522 for connecting the system 500 to the various networks that are known in the art. A Central Processing Unit (CPU) 523 may be connected to the bus 525 and may provide for the execution of computer instructions. Memory 524 may provide volatile storage for data used for carrying out computer instructions. Any type of persistent storage 529 may provide non-volatile storage for software instructions such as the operating system (OS) 526 and the data 528. Coupled with the OS 526, may be the file system 527. Persistent storage 529 may be any storage device known in the art.

According to some embodiments, the system 500 may comprise one or more passive optical modules 562 and an active optical module 570. The active optical module 570 may be configured to retrieve information from (or send information to) one or more of the passive optical modules 562. The retrieved information may be any data as described herein. The active optical module 570 (and the passive optical modules 562) may retrieve the information from (or send the information to) any communicatively coupled source. For example, the active optical module 570 (and the passive optical modules 562) may retrieve the information from (or send information to) the storage device 529 or via the input/output interface 521 or network interface 522 or active optical module 570. Communications between these modules 562, 570 may be facilitated from any communicatively coupled source, including, but not limited to, the network 522, from the input/output interface 521, the memory 524, or from persistent storage 529 or other non-transitory computer-readable medium.

According to some embodiments, while the various components of the system 500 are illustrated in FIG. 5, embodiments of the system 500 are not so limited, and, as is known in the art, components and modules of the system 500 may be connected in a variety of ways, including embodiments wherein one or more components may be remotely located. It should be understood by a person of ordinary skill in the art that the system 500 may be implemented in various forms. The respective components and modules of the system 500 may be combined in any manner that is known in the art and may be implemented in any combination of hardware and software. For example, the above-described components and modules may be executable instructions in memory 524 or OS 526 operated on by CPU 523. Further, the system 500 and its various components and modules may be configured to operate in a manner corresponding to the above-described method 500, described herein above in relation to FIGS. 1A-4B and their various embodiments.

Figure 6:
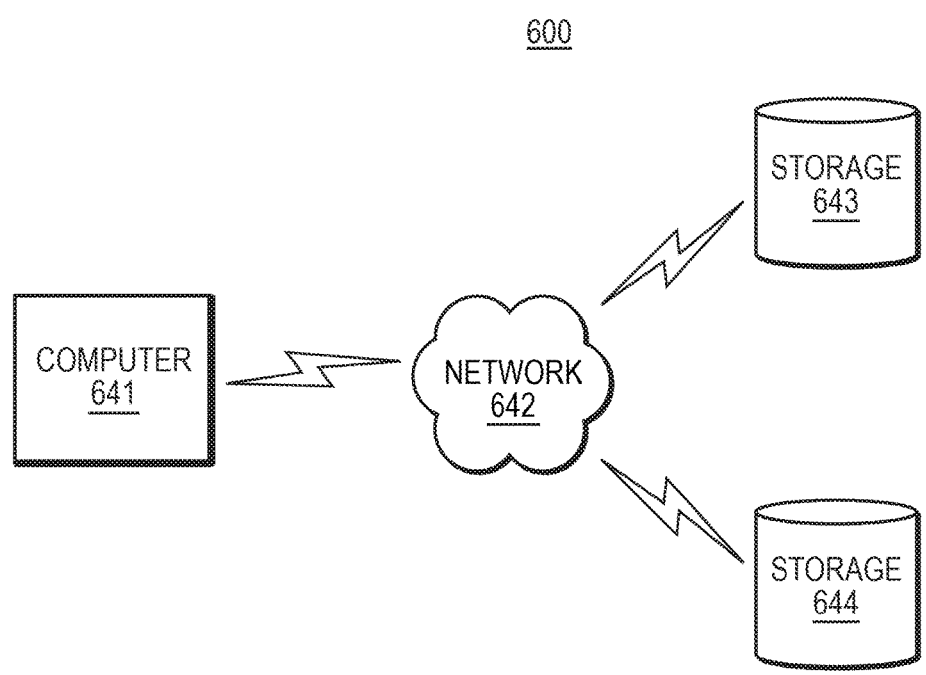
FIG. 6 is a schematic view of an optical computer network environment in which some embodiments may be implemented.

FIG. 6 illustrates another optical computer network environment 600 in which embodiments of the present invention may be implemented. The computer 641 and the storage devices 643 and 644 are linked through an optical network 642 (or any other type of network known to one skilled in the art). The computer 641 and the storage devices 643 and 644 may be connected through any optical network as is known in the art, including a fiber-optic network, optical wide area network (WAN), an optical local area network (LAN), free-space optical network, a passive optical network, and/or any other type of optical network. The computer 641 may embody the system 600 and/or any embodiment of the system 600 described herein. Similarly, the computer 641 may be configured to carry out any method or embodiment thereof described herein. While only two storage devices 643 and 644 are depicted, the computer network environment 600 may comprise any number of storage devices.

While this disclosure has been particularly shown and described with references to example embodiments thereof, it will be understood by those skilled in the art that various changes in form and details may be made therein without departing from the scope of the disclosure encompassed by the appended claims.

It should be understood that the example embodiments described above may be implemented in many different ways. In some embodiments, the various methods and machines described herein may be implemented by a physical, virtual or hybrid general-purpose computer, or an optical computer network environment such as the optical computer network environments of FIGS. 1A-6. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transitory computer readable medium that may be configured to enable a processor to load the software or subsets of instructions thereof. The processor then executes the instructions and may be configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, some embodiments may also be implemented in a variety of computer architectures, optical, physical, virtual, cloud computers, and/or some combination thereof, and, thus, the data processors described herein are intended for purposes of illustration only and not as a limitation of the embodiments.

What is claimed is:

1. An optical networking system, comprising:
   a plurality of shelves that are interconnected to form a daisy chain, each shelf comprising one or more unpowered passive optical networking modules;
   a passive power communication source within an active optical networking module at a head end of the daisy chain, the passive power communication source configured to distribute passive power to one or more memory devices on the one or more unpowered passive optical networking modules daisy chained within the plurality of shelves of the system, the one or more unpowered passive optical networking modules being otherwise unpowered, and the one or more memory devices providing respective communication as a function of interconnections of the daisy chaining and passive power distributed by the passive power communication source.

2. The optical networking system of claim 1, wherein the active optical networking module determines memory device information including a shelf address from each of the one or more memory devices through the passive power communication source.

3. The optical networking system of claim 1, wherein the passive power communication source distributes the passive power based upon circuitry including at least one diode and at least one capacitor.

4. The optical networking system of claim 1, wherein the passive power communication source distributes the passive power of 5 milliWatts or less to each of the one or more memory devices.

5. The optical networking system of claim 1, wherein each of the one or more memory devices determines a unique address for each of the corresponding one or more unpowered passive optical networking modules based upon connections to the ground source and the memory device information including the unique address.

6. The optical networking system of claim 1, wherein the plurality of shelves form the daisy chain by connecting a series of second conductors of each shelf to a series of first conductors of each next shelf of the daisy chain, each shelf has a crosshatch comprising the series of first conductors and the series of second conductors, the series of second conductors having a same number of conductors as the series of first conductors and at least one conductor in a position in the first series being connected to a conductor in a respective incrementally next position in the second series, the active optical networking module forwards sources to the series of first conductors of a crosshatch of one of the plurality of shelves, the sources including a grounded source and the passive power communication source.

7. The optical networking system of claim 6, wherein the sources further include a floating source.

8. The optical networking system of claim 6, wherein each of the one or more unpowered passive optical networking modules determines a shelf address based upon the series of first conductors of a crosshatch corresponding to the shelf.

9. The optical networking system of claim 6, wherein each conductor of a plurality of conductors of the first series is connected to a conductor in a respective incrementally next position in the second series.

10. The optical networking system of claim 6, wherein every other conductor of a plurality of conductors of the first series is connected to every other respective conductor in a respective incrementally next position in the second series.

11. The optical networking system of claim 6, wherein the sources are optical networking layer 1 sources.

12. An optical networking method, comprising:
   providing a plurality of shelves that are interconnected to form a daisy chain, each shelf comprising one or more unpowered passive optical networking modules;
   providing a passive power communication source within an active optical networking module at a head end of the daisy chain, the passive power communication source configured to distribute passive power to one or more memory devices on the one or more unpowered passive optical networking modules daisy chained within the plurality of shelves of the system, the one or more unpowered passive optical networking modules being otherwise unpowered, and the one or more memory devices providing respective communication as a function of interconnections of the daisy chaining and passive power distributed by the passive power communication source.

13. The optical networking method of claim 12, wherein the active optical networking module determines memory device information including a shelf address from each of the one or more memory devices through the passive power communication source.

14. The optical networking method of claim 12, wherein the passive power communication source distributes the passive power based upon circuitry including at least one diode and at least one capacitor.

15. The optical networking method of claim 12, wherein the passive power communication source distributes the passive power of 5 milliWatts or less to each of the one or more memory devices.

16. The optical networking method of claim 12, wherein each of the one or more memory devices determines a unique address for each of the corresponding one or more unpowered passive optical networking modules based upon connections to the ground source and the memory device information including the unique address.

17. The optical networking method of claim 12, wherein the plurality of shelves form the daisy chain by connecting a series of second conductors of each shelf to a series of first conductors of each next shelf of the daisy chain, each shelf has a crosshatch comprising the series of first conductors and the series of second conductors, the series of second conductors having a same number of conductors as the series of first conductors and at least one conductor in a position in the first series being connected to a conductor in a respective incrementally next position in the second series, the active optical networking module forwards sources to the series of first conductors of a crosshatch of one of the plurality of shelves, the sources including a grounded source and the passive power communication source.

18. The optical networking method of claim 17, wherein the sources further include a floating source.

19. The optical networking method of claim 17, wherein each of the one or more unpowered passive optical networking modules determines a shelf address based upon the series of first conductors of a crosshatch corresponding to the shelf.

20. The optical networking method of claim 17, wherein each conductor of a plurality of conductors of the first series is connected to a conductor in a respective incrementally next position in the second series.

21. The optical networking method of claim 17, wherein every other conductor of a plurality of conductors of the first series is connected to every other respective conductor in a respective incrementally next position in the second series.

22. The optical networking method of claim 17, wherein the sources are optical networking layer 1 sources.

\* \* \* \* \*